US008808083B1

(12) United States Patent
Caputo et al.

(10) Patent No.: US 8,808,083 B1
(45) Date of Patent: Aug. 19, 2014

(54) GAMING SYSTEM AND METHOD FOR PROVIDING A MULTIPLE ROUND OFFER AND ACCEPTANCE GAME

(71) Applicant: IGT, Reno, NV (US)

(72) Inventors: Scott A. Caputo, Santa Clara, CA (US); Brian F. Saunders, Sunnyvale, CA (US); Jon M. Leupp, Orinda, CA (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/801,798

(22) Filed: Mar. 13, 2013

(51) Int. Cl.

| | |
|---|---|
| ***A63F 13/00*** | (2014.01) |
| ***G07F 17/32*** | (2006.01) |
| *G07F 17/34* | (2006.01) |

(52) U.S. Cl.
CPC ............ *G07F 17/32* (2013.01); *G07F 17/3244* (2013.01); *G07F 17/34* (2013.01)
USPC .................................. 463/20; 463/16; 463/25

(58) Field of Classification Search
None
See application file for complete search history.

(56) References Cited

U.S. PATENT DOCUMENTS

| | | | |
|---|---|---|---|
| 3,559,993 | A | 2/1971 | Thomas |
| 3,770,277 | A | 11/1973 | Cass |
| 4,363,489 | A | 12/1982 | Chodak et al. |
| 4,448,419 | A | 5/1984 | Telnaes |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,991,848 | A | 2/1991 | Greenwood et al. |
| 5,178,390 | A | 1/1993 | Okada |
| 5,205,555 | A | 4/1993 | Hamano |
| 5,342,047 | A | 8/1994 | Heidel et al. |
| 5,456,465 | A | 10/1995 | Durham |
| 5,511,781 | A | 4/1996 | Wood et al. |
| 5,524,888 | A | 6/1996 | Heidel |
| 5,531,440 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,611,535 | A | 3/1997 | Tiberio |
| 5,711,525 | A | 1/1998 | Breeding |
| 5,769,716 | A | 6/1998 | Saffari et al. |
| 5,772,509 | A | 6/1998 | Weiss |

(Continued)

FOREIGN PATENT DOCUMENTS

| | | |
|---|---|---|
| EP | 0874337 | 10/1998 |
| EP | 0926645 | 6/1999 |

(Continued)

*Primary Examiner* — Dmitry Suhol
*Assistant Examiner* — Jason Yen
(74) *Attorney, Agent, or Firm* — Neal, Gerber & Eisenberg LLP

(57) ABSTRACT

In various embodiments, the offer and acceptance game includes a plurality of rounds and a pool of displayed awards. For each round, the gaming system randomly selects one or more of the displayed awards of the pool of awards, wherein the quantity of randomly selected awards is determined by the player. For each round, the gaming system selects one or more of such selected award(s) and accumulates these selected award(s) for the player. For each round, the gaming system also removes each randomly selected award from the pool, such that, regardless of whether or not the randomly selected award is also accumulated for the player, the gaming system classifies each randomly selected award as unavailable to be selected for another round. Following the completion of a final round, the gaming system determines and displays a total award based on the awards accumulated for the player in each of the rounds.

18 Claims, 17 Drawing Sheets

(56) References Cited

U.S. PATENT DOCUMENTS 5,775,692 A 7/1998 Watts et al.
5,788,573 A 8/1998 Baerlocher et al.
5,807,172 A 9/1998 Piechowiak
5,823,874 A 10/1998 Adams
5,833,538 A 11/1998 Weiss
5,848,932 A 12/1998 Adams
5,851,148 A 12/1998 Brune et al.
5,873,781 A 2/1999 Keane
5,882,261 A 3/1999 Adams
5,890,963 A 4/1999 Yen
5,902,184 A 5/1999 Bennett
5,911,418 A 6/1999 Adams
5,935,002 A 8/1999 Falciglia
5,947,820 A 9/1999 Morro et al.
5,951,397 A 9/1999 Dickinson
5,964,463 A 10/1999 Moore, Jr.
5,967,894 A 10/1999 Kinoshita et al.
5,980,384 A 11/1999 Barrie
5,984,781 A 11/1999 Sunaga
5,997,400 A 12/1999 Seelig et al.
5,997,401 A 12/1999 Crawford
6,004,207 A 12/1999 Wilson, Jr. et al.
6,015,346 A 1/2000 Bennett
6,019,369 A 2/2000 Nakagawa et al.
6,033,307 A 3/2000 Vancura
6,056,642 A 5/2000 Bennett
6,059,289 A 5/2000 Vancura
6,059,658 A 5/2000 Mangano et al.
6,062,980 A 5/2000 Luciano
6,089,976 A 7/2000 Schneider et al.
6,089,977 A 7/2000 Bennett
6,089,978 A 7/2000 Adams
6,093,102 A 7/2000 Bennett
6,102,798 A 8/2000 Bennett
6,120,031 A 9/2000 Adams
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,146,273 A 11/2000 Olsen
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,174,235 B1 1/2001 Walker et al.
6,189,886 B1 2/2001 Moran
6,190,254 B1 2/2001 Bennett
6,190,255 B1 2/2001 Thomas et al.
6,203,429 B1 3/2001 Demar et al.
6,210,279 B1 4/2001 Dickinson
6,213,876 B1 4/2001 Moore, Jr.
6,224,483 B1 5/2001 Mayeroff
6,231,442 B1 5/2001 Mayeroff
6,231,445 B1 5/2001 Acres
6,261,177 B1 7/2001 Bennett
6,302,790 B1 10/2001 Brossard
6,305,686 B1 10/2001 Perrie et al.
6,309,300 B1 10/2001 Glavich
6,315,664 B1 11/2001 Baerlocher et al.
6,328,649 B1 12/2001 Randall et al.
6,364,766 B1 4/2002 Anderson et al.
6,375,187 B1 4/2002 Baerlocher
6,398,218 B1 6/2002 Vancura
6,413,160 B1 7/2002 Vancura
6,413,161 B1 7/2002 Baerlocher et al.
6,435,511 B1 8/2002 Vancura et al.
6,439,995 B1 8/2002 Hughs-Baird et al.
6,461,241 B1 10/2002 Webb et al.
6,464,582 B1 10/2002 Baerlocher et al.
6,494,785 B1 12/2002 Gerrard et al.
6,506,118 B1 1/2003 Baerlocher et al.
6,514,141 B1 2/2003 Kaminkow et al.
6,537,152 B2 3/2003 Seelig et al.
6,561,899 B2 5/2003 Vancura
6,569,015 B1 5/2003 Baerlocher et al.
6,575,830 B2 6/2003 Baerlocher et al.
6,585,591 B1 7/2003 Baerlocher et al.
6,592,457 B1 7/2003 Frohm et al.
6,595,854 B2 7/2003 Hughs-Baird et al.
6,599,192 B1 7/2003 Baerlocher et al.
6,612,575 B1 9/2003 Cole et al.
6,620,045 B2 9/2003 Berman et al.
6,632,141 B2 10/2003 Webb et al.
6,634,943 B1 10/2003 Baerlocher
6,641,477 B1 11/2003 Dietz, II
6,648,754 B2 11/2003 Baerlocher et al.
6,659,864 B2 12/2003 McGahn et al.
6,676,516 B2 1/2004 Baerlocher et al.
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,758,750 B2 7/2004 Baerlocher et al.
6,786,820 B2 9/2004 Gerrard et al.
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,852,030 B2 2/2005 Baerlocher et al.
6,889,978 B2 5/2005 Schaefer et al.
6,890,257 B2 5/2005 Baerlocher
6,899,623 B2 5/2005 Baerlocher
6,939,226 B1 9/2005 Joshi
6,942,566 B2 9/2005 Baerlocher et al.
6,942,567 B2 9/2005 Baerlocher et al.
6,960,132 B2 11/2005 Baerlocher et al.
6,966,833 B2 11/2005 Kaminkow et al.
6,971,953 B2 12/2005 Gerrard et al.
7,001,273 B2 2/2006 Baerlocher
7,104,886 B2 9/2006 Baerlocher et al.
7,794,316 B2 9/2010 Palmer et al.
7,963,838 B2 6/2011 Gauselmann
8,632,387 B2 * 1/2014 Amaitis .......................... 463/18
2002/0025843 A1 2/2002 Bryant
2002/0045475 A1 4/2002 Glavich et al.
2002/0049084 A1 4/2002 Hughs-Baird et al.
2002/0052232 A1 5/2002 Kaminkow
2002/0072402 A1 6/2002 Baerlocher
2002/0142821 A1 10/2002 Baerlocher
2002/0142822 A1 10/2002 Baerlocher et al.
2002/0151351 A1 10/2002 Baerlocher et al.
2002/0155883 A1 10/2002 Baerlocher
2002/0187827 A1 12/2002 Blankstein
2002/0198036 A1 12/2002 Baerlocher et al.
2003/0013514 A1 * 1/2003 Cregan et al. ................... 463/20
2003/0040355 A1 2/2003 Baerlocher
2003/0040358 A1 2/2003 Rothkranz et al.
2003/0040360 A1 2/2003 Kaminkow
2003/0045344 A1 3/2003 Webb et al.
2003/0045348 A1 3/2003 Palmer et al.
2003/0045350 A1 3/2003 Baerlocher et al.
2003/0060260 A1 3/2003 Gerrard et al.
2003/0064770 A1 4/2003 Kaminkow et al.
2003/0064795 A1 4/2003 Baerlocher et al.
2003/0078093 A1 4/2003 Simms et al.
2003/0087693 A1 5/2003 Baerlocher et al.
2003/0090063 A1 5/2003 Jarvis et al.
2003/0157982 A1 8/2003 Gerrard et al.
2003/0162584 A1 8/2003 Hughs-Baird et al.
2003/0211880 A1 11/2003 Locke
2003/0216167 A1 11/2003 Gauselmann
2004/0009805 A1 1/2004 Baerlocher et al.
2004/0023707 A1 2/2004 Maya et al.
2004/0038729 A1 2/2004 Webb et al.
2004/0053660 A1 3/2004 Webb et al.
2004/0053665 A1 3/2004 Baerlocher
2004/0053669 A1 3/2004 Gerrard et al.

(56) References Cited

U.S. PATENT DOCUMENTS

| | | | |
|---|---|---|---|
| 2004/0063493 | A1 | 4/2004 | Baerlocher |
| 2004/0106444 | A1 | 6/2004 | Cuddy et al. |
| 2004/0162128 | A1 | 8/2004 | Baerlocher et al. |
| 2004/0180710 | A1 | 9/2004 | Palmer et al. |
| 2004/0185928 | A1 | 9/2004 | Baerlocher et al. |
| 2004/0214632 | A1 | 10/2004 | Cuddy et al. |
| 2005/0020346 | A1 | 1/2005 | Baerlocher |
| 2005/0032567 | A1 | 2/2005 | Baerlocher et al. |
| 2005/0037829 | A1 | 2/2005 | Baerlocher et al. |
| 2005/0049036 | A1* | 3/2005 | Mead .............................. 463/25 |
| 2005/0054413 | A1 | 3/2005 | Randall et al. |
| 2005/0055115 | A1 | 3/2005 | Gerrard et al. |
| 2005/0101375 | A1 | 5/2005 | Webb et al. |
| 2005/0130729 | A1 | 6/2005 | Baerlocher et al. |
| 2005/0153767 | A1 | 7/2005 | Gauselmann |
| 2005/0187010 | A1 | 8/2005 | Baerlocher |
| 2005/0266914 | A1 | 12/2005 | Baerlocher et al. |
| 2006/0003837 | A1 | 1/2006 | Baerlocher et al. |
| 2012/0015708 | A1* | 1/2012 | Kroeckel et al. ................ 463/20 |
| 2012/0238344 | A1* | 9/2012 | Hodgson et al. ................ 463/18 |

FOREIGN PATENT DOCUMENTS

| | | |
|---|---|---|
| EP | 0944030 | 9/1999 |
| EP | 0945837 | 9/1999 |
| EP | 0981119 | 2/2000 |
| EP | 0984408 | 3/2000 |
| EP | 0984409 | 3/2000 |
| EP | 1298609 | 4/2003 |
| EP | 1175928 | 7/2004 |
| WO | WO/97/32285 | 9/1997 |
| WO | WO/00/12186 | 3/2000 |

* cited by examiner

GAMING SYSTEM AND METHOD FOR PROVIDING A MULTIPLE ROUND OFFER AND ACCEPTANCE GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

One such type of secondary or bonus game is an offer and acceptance game which enables players to accept or decline multiple award offers. One such gaming device provides the player with a quantity of offers and a final award. When an offer is given, the player may accept or reject the offer. If the player accepts an offer, the player receives the accepted offer amount and the bonus game terminates. If the player declines an offer, the game generates another offer for the player. The player is automatically provided with the last selected offer if the player rejects each of the quantity of previous offers. In this known offer/acceptance game, when the player rejects an offer, the player risks a current or guaranteed award for a higher value award. The game may instead provide a lower award. The game thus creates a risk for the player.

Enabling a player to pick from different risk based alternatives and then enabling the player to accumulate awards or offers from the selected alternatives provides excitement and enjoyment to the player. A continuing need exists to provide offer/acceptance games that enable a player to weigh options and explore the consequences of selecting those options where the player may accumulate awards or offers.

SUMMARY

The present disclosure relates generally to gaming systems and methods for providing a multiple round offer and acceptance game.

In various embodiments, the multiple round offer and acceptance game disclosed herein includes a plurality of rounds or levels and a set or pool of displayed awards associated with each of the plurality of rounds or levels. In these embodiments, for each round or level, the gaming system randomly selects one or more of the displayed awards of the set or pool of awards, wherein the quantity of randomly selected awards is determined by the player. For each round or level, from the player determined quantity of randomly selected awards for that round, the gaming system selects one or more of such selected award(s) and accumulates these selected award(s) for the player. In these embodiments, for each round or level, the gaming system also removes each randomly selected award from the set or pool, such that, regardless of whether or not the randomly selected award is also accumulated for the player, the gaming system classifies each randomly selected award as unavailable to be selected for another round or level of the multiple round offer and acceptance game. Following the completion of a final round or level (or alternatively upon a depletion of each of the awards from the set or pool of awards), the gaming system determines and displays a multiple round offer and acceptance game total award based on the awards accumulated for the player in each of the rounds or levels.

In these embodiments, such a configuration of removing both the randomly selected accumulated award(s) and the randomly selected non-accumulated award(s) provides an increased amount of excitement and enjoyment for certain players when deciding the quantity of awards to be randomly selected for each round or level. That is, knowing that the greater the quantity of awards randomly selected for a current round correlates to a lesser quantity of awards available to be selected for any subsequent rounds (or, put differently, knowing that the lower the quantity of awards randomly selected for a current round correlates to a greater quantity of awards available to be selected for any subsequent rounds) introduces an element of player strategy into the multiple round offer and acceptance game which certain players enjoy. Accordingly, the gaming system of these embodiments enables the player to make one or more decisions to: (i) limit the quantity of displayed awards selected from the pool of awards for one or more rounds, wherein such limitation is associated with the player potentially forfeiting the selection of a lucrative award from the pool of awards for that round or (ii) not limit the quantity of displayed awards selected from the pool of awards for one or more rounds wherein the quantity of selected displayed awards become unavailable for subsequent selections in any subsequent rounds.

In certain embodiments, upon an occurrence of an offer and acceptance game triggering event, the gaming system displays a set or pool of awards to the player. The set or pool of awards includes a plurality of displayed awards such that for each round of the offer and acceptance game, the player is aware of the awards currently in the set or pool of awards. Following the display of the set OF pool of awards, for a round of the offer and acceptance game, the gaming system randomly selects one of the awards currently in the set or pool and removes the randomly selected award from the set or pool. Such removal or elimination of the randomly selected award causes the randomly selected award to be unavailable for selection in any future remaining rounds of the offer and acceptance game.

Following the random selection and removal of this award from the pool of awards, the gaming system forms a subset of randomly selected awards for the current round. The formed award subset includes the current randomly selected award and any previous randomly selected awards for the current round. Following the formation of the subset of randomly selected awards for the current round, if the current randomly selected award (i.e., the most recently randomly selected award) is not the final award available for the current round of the offer and acceptance game (i.e., at least one more award in the set or pool remains available to be selected in the current round), the gaming system enables the player to accept or reject the formed subset of randomly selected awards for the Current round of the offer and acceptance game.

If the player accepts the formed subset of randomly selected awards for the current round or the current randomly selected award is a final award for the current round (i.e., no awards remain available in the set or pool of awards to be selected for the current round), the gaming system accumulates one of the awards from the formed subset of randomly selected awards for the current round. As described below, the gaming system subsequently utilizes this accumulated award as an award component of the offer and acceptance game total award. Accordingly, in these embodiments, upon the players decision to cease the random selection of awards for the current round of the offer and acceptance game, the gaming system randomly selects and accumulates one of the previous randomly selected awards, such that this twice randomly selected award (i.e., a first random selection of the award from the pool of awards and a second random selection of the award from the formed subset of randomly selected awards) becomes an award component of the offer and acceptance game total award.

It should thus be appreciated that while the gaming system removes, from the pool or set of awards, each of the randomly selected awards of the formed subset of awards for the current round, the gaming system accumulates one (or alternatively a plurality, but less than all) of these randomly selected awards of the formed subset of awards for the current round to form at least part of the offer and acceptance game total award. It should further be appreciated that in certain embodiments, the probability of accumulating any of the award(s) of the subset of awards is based on the quantity of awards in the formed subset of awards. Such a configuration provides an increased amount of excitement and enjoyment for certain players when deciding the quantity of awards to be randomly selected for each round or level because such players appreciate that as the player increases the quantity of awards in the formed subset of randomly selected awards (i.e., as the player delays the acceptance of the formed subset of awards), the probability of any particular one of the awards in the formed subset of randomly selected awards decreases. Such a configuration further provides an increased amount of excitement and enjoyment for certain players when deciding the quantity of awards to be randomly selected for each round or level because such players appreciate that if they accept the first award randomly selected in a round or level, the player is guaranteed to accumulate such a randomly selected award.

if the player rejects the formed subset of randomly selected awards for the current round and the current randomly selected award is not a final award available for that round (i.e., at least one more award in the set or pool remains available to be selected in the current round), the gaming system randomly selects another one of the awards currently in the set or pool and removes this randomly selected award from the set or pool. The gaming system adds this randomly selected award to the formed subset of randomly selected awards for the current round. The gaming system then proceeds as described above until either the player accepts the formed subset of randomly selected awards for the current round or the current randomly selected award is the final award available for that round.

Following either the player accepting the formed subset of randomly selected awards for the current round or the current randomly selected award being the final award available for that round and following the subsequent accumulation of a randomly selected award (from the formed subset of randomly selected awards for the current round) as an award component of the offer and acceptance game total award, the gaming system determines if any rounds of the offer and acceptance game remain unplayed.

If at least one round remains unplayed, the gaming system advances to the next round and proceeds as described above with randomly selecting an award (from the pool of available awards) as an award component of the offer and acceptance game total award. It should be appreciated that for the next round of the offer and acceptance game, any randomly selected awards removed from the set or pool of awards in any previous round remain unavailable for selection in the proceeding round. That is, a player's decision to continue rejecting randomly selected awards for one round (and thus the player's decision to utilize a first quantity of awards in the subset of awards for one round) affects the quantity of awards available to be selected from the set or pool for one or more subsequent rounds.

If no rounds remain unplayed for the offer and acceptance game (i.e., the player has reached the final round), the gaming system determines an offer and acceptance game total award. In one embodiment, the offer and acceptance game total award is based on the accumulated randomly selected awards for the different rounds of the offer and acceptance game. That is, as each accepted randomly selected award (or each award randomly selected from each accepted subset of randomly selected awards) represents an award component of the offer and acceptance game total award, the gaming system determines an offer and acceptance game total award based on such award components.

In one such embodiment, the gaming system displays a plurality of available awards to a player and randomly selects one of the plurality of available awards. The gaming system of this embodiment forms an award subset including the randomly selected award, and removes the randomly selected award from the plurality of available awards, wherein the removed award is unavailable to be randomly selected again for the play of the game. If the randomly selected award is not a final award, the gaming system enables the player to accept or reject the formed award subset. If the player accepts the formed award subset, the gaming system randomly selects one of the awards from the formed award subset, and accumulates the randomly selected award from the formed subset of award. On the other hand, if the player rejects the formed award subset, the gaming system randomly selects another one of the plurality of available awards, adds the other randomly selected award to the formed award subset, and at least once repeats the process of removing this randomly selected award from the plurality of available awards and if this randomly selected award is not a final award, enabling the player to accept or reject the modified formed award subset.

In different embodiments, the offer and acceptance games disclosed herein thus provide that certain players will account for different variables (and in certain instances, different competing variables) when determining whether to accept or reject each formed subset of randomly selected awards. Accordingly, the gaming system described herein provides an interesting and exciting offer and acceptance game for players wherein the players individual decisions regarding accepting or rejecting awards for one round affects the quantity of awards available to be selected for one or more subsequent rounds.

Additional features and advantages are described in, and will be apparent from, the following Detailed Description and the figures.

BRIEF DESCRIPTION OF THE FIGURES

FIGS. 2A, 23, 2C, 2D, 2E, 2F, 2G, 2H, 2I, 2J, 2K and 2L are front views of one embodiment of the gaming system disclosed herein illustrating a multiple round offer and acceptance game including a displayed set of awards.

DETAILED DESCRIPTION

Offer and Acceptance Game

Figure 1:
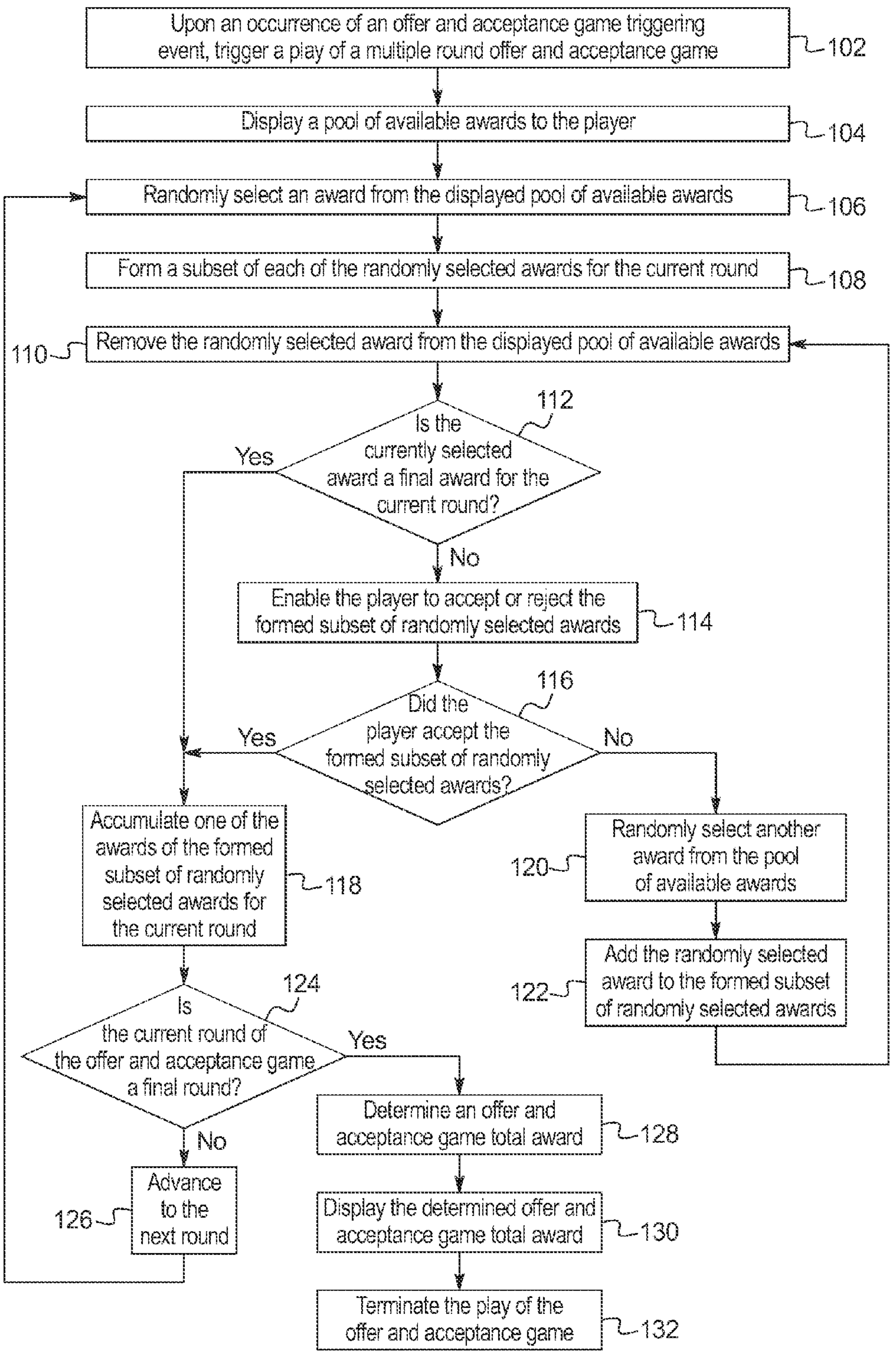
FIG. 1 is a flow chart an example process for operating a gaming system providing one embodiment of a multiple round offer and acceptance game disclosed herein.

In various embodiments, the multiple round offer and acceptance game disclosed herein includes a plurality of rounds or levels and a set or pool of displayed awards associated with each of the plurality of rounds or levels. In these embodiments, for each round or level, the gaming system randomly selects one or more of the displayed awards of the set or pool of awards, wherein the quantity of randomly selected awards is determined by the player. For each round or level, from the player determined quantity of randomly selected awards for that round, the gaming system selects one or more of such selected award(s) and accumulates these selected award(s) for the player. In these embodiments, for each round or level, the gaming system also removes each randomly selected award from the set or pool, such that, regardless of whether or not the randomly selected award is also accumulated for the player, the gaming system classifies each randomly selected award as unavailable to be selected for another round or level of the multiple round offer and acceptance game. Following the completion of a final round or level (or alternatively upon a depletion of each of the awards from the set or pool of awards), the gaming system determines and displays a multiple round offer and acceptance game award based on the awards accumulated for the player in each of the rounds or levels. In these embodiments, such a configuration of removing both the randomly selected accumulated award(s) and the randomly selected non-accumulated award(s) provides an increased amount of excitement and enjoyment for certain players when deciding the quantity of awards to be randomly selected for each round or level. That is, knowing that the greater the quantity of awards randomly selected for a current round correlates to a lesser quantity of awards available to be selected for any subsequent rounds (or, put differently, knowing that the lower the quantity of awards randomly selected for a current round correlates to a greater quantity of awards available to be selected for any subsequent rounds) introduces an element of player strategy into the multiple round offer and acceptance game which certain players enjoy. Accordingly, the gaming system of these embodiments enables the player to make one or more decisions to: (i) limit the quantity of displayed awards selected from the pool of awards for one or more rounds, wherein such limitation is associated with the player potentially forfeiting the selection of a lucrative award from the pool of awards for that round or (ii) not limit the quantity of displayed awards selected from the pool of awards for one or more rounds wherein the quantity of selected displayed awards become unavailable for subsequent selections in any subsequent rounds.

While certain of the embodiments described below are directed to a secondary or bonus game, it should be appreciated that the present disclosure may additionally or alternatively be employed in association with a primary or base wagering game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, upon an occurrence of an offer and acceptance game triggering event, as indicated in block 102 of FIG. 1, the gaming system triggers a play of a multiple round offer and acceptance game. In one embodiment, the offer and acceptance game is a secondary or bonus game wherein an offer and acceptance game triggering event occurs based on a displayed event associated with a wagered on play of a primary game. In another such embodiment wherein the offer and acceptance game is a secondary or bonus game, an offer and acceptance game triggering event occurs based on an event independent of any displayed event associated with a wagered on play of a primary game. In another such embodiment, the offer and acceptance game is a primary game wherein an offer and acceptance game triggering event occurs upon a player placing a wager to play the offer and acceptance game.

In one embodiment, for the triggered offer and acceptance game, the gaming system displays a pool of available awards to the player as indicated in block 104. This pool, set or deck of awards includes a plurality of awards available to be selected during the triggered offer and acceptance game. In different embodiment, the gaming system displays one, more or each of the awards of the pool of awards such that for each round of the offer and acceptance game, the player is aware of one, more or each of the awards currently in the set or pool of awards.

In conjunction with displaying the plurality of awards of the pool of available awards, for the current round of the offer and acceptance game, the gaming system randomly selects one of the awards from the pool of available awards as indicated in block 106 of FIG. 1.

Following the selection of one of the awards from the pool of available awards, the gaming system forms a subset of each of the randomly selected awards for the current round as indicated in block 108. The formed subset includes the current randomly selected award and any previous randomly selected awards for the current round.

In addition to forming the subset of each of the randomly selected awards for the current round, the gaming system removes the randomly selected award from the pool of available awards as indicated in block 110. By removing or eliminating the randomly selected award from the pool, the gaming system causes the randomly selected award to be unavailable for selection in any future remaining rounds of the offer and acceptance game.

Following the designation of the selected award as unavailable for subsequent selections in association with the current play of the offer and acceptance game, the gaming system determines if the currently selected award is a final award for the current round as indicated in diamond 112 of FIG. 1. That is, the gaming system determines if, for the current round of the offer and acceptance game, at least one award remains available in the pool of awards for the gaming system to randomly select.

If the gaming system determines that the currently selected award is not a final award for the current round, the gaming system enables the player to accept or reject the formed subset of randomly selected awards as indicated in block 114. After the player makes one or more inputs regarding whether to accept or reject the formed subset of randomly selected awards, the gaming system determines if the player accepted the formed subset of randomly selected awards as indicated in diamond 116. Such an embodiment enables the player to determine the quantity of randomly selected awards in the subset of awards by determining when to accept the formed subset of randomly selected awards.

If the player accepts the formed subset of randomly selected awards or if the gaming system determines that the currently selected award is a final award for the current round, the gaming system accumulates one of the awards of the formed subset of randomly selected awards for the current round as indicated in block 118. Such an accumulation includes the gaming system randomly selecting one of the awards in the formed subset of randomly selected awards, wherein this twice randomly selected award (i.e., a first random selection of the award from the pool of awards and a second random selection of the award from the formed subset of randomly selected awards) is accumulated and each of the once randomly selected awards (i.e., awards associated with a first random selection of the award from the pool of awards) are discarded or otherwise not accumulated for the current round.

In one embodiment, for each of the awards in the formed subset of awards, the probability of accumulating that award is based on the quantity of awards in the subset of awards. For example, if a subset includes one randomly selected award, that randomly selected award is associated with a 100% probability of being accumulated for the current round. In this example, if the player accepts the formed subset having a single award, the player is ensured of accumulating that single award for the current round of the offer and acceptance game. In another example, if a subset includes two randomly selected awards, each of the randomly selected awards are associated with a 50% probability of being accumulated for the current round. In this example, if the player accepts the formed subset having two awards, the player is not ensured of accumulating any particular one of the awards for the current round of the offer and acceptance game. Such a configuration provides that as the player increases the quantity of awards in the formed subset of randomly selected awards, the probability of any particular one of the awards in the formed subset of randomly selected awards decreases.

If the player rejects the formed subset of randomly selected awards, the gaming system randomly selects another award from the pool of available awards and adds this randomly selected award to the formed subset of randomly selected awards as indicated in blocks 120 and 122. The gaming system then returns to block 110 and removes the randomly selected award from the pool of available awards. As described above, by removing or eliminating the randomly selected award from the pool, the gaming system causes the randomly selected award to be unavailable for selection in any future remaining rounds of the offer and acceptance game. This process continues until the gaming system accumulates one of the awards of the formed subset of randomly selected awards for the current round (which occurs following either the player accepting the formed subset of randomly selected awards for the current round or the current randomly selected award being the final award available for that round).

Following the accumulation of one of awards of the formed subset of randomly selected awards for the current round, the gaming system determines if the current round of the offer and acceptance game is a final round as indicated in diamond 124. That is, the gaming system determines if any rounds of the offer and acceptance game remain unplayed.

If the current round is not the final round (i.e., at least one round remains unplayed), the gaming system advances to the next round as indicated in block 126. The gaming system then returns to block 106 and proceeds with randomly selecting one of the awards from the pool of available awards for the next (or then current) round. It should be appreciated that for the next round of the offer and acceptance game, any randomly selected awards removed from the set or pool of awards in any previous round remain unavailable for selection in the proceeding round. That is, a player's decision to continue rejecting randomly selected awards for one round (and thus the player's decision to utilize a first quantity of awards in the subset of awards for one round) affects the quantity of awards available to be selected from the set or pool for one or more subsequent rounds. It should be further appreciated that for each round, the gaming system of certain embodiments forms another subset of awards randomly selected in that particular round. Accordingly, the offer and acceptance game of this example utilizes the same pool of awards for each round of the game while also utilizing different subsets of awards for each round of the game.

If the current round is the final round (i.e., no rounds remain unplayed or no awards remain in the pool of available awards), the gaming system determines an offer and acceptance game total award as indicated in block 128. In one embodiment, the offer and acceptance game total award is based on the accumulated randomly selected awards for the different rounds of the offer and acceptance game. That is, as each accepted randomly selected award (or each award randomly selected from each accepted subset of randomly selected awards) represents an award component of the offer and acceptance game total award, the gaming system determines an offer and acceptance game total award based on such award components. The gaming system then displays the determined offer and acceptance game total award and terminates the play of the offer and acceptance game as indicated in block 130 and 132.

Figure 2A:
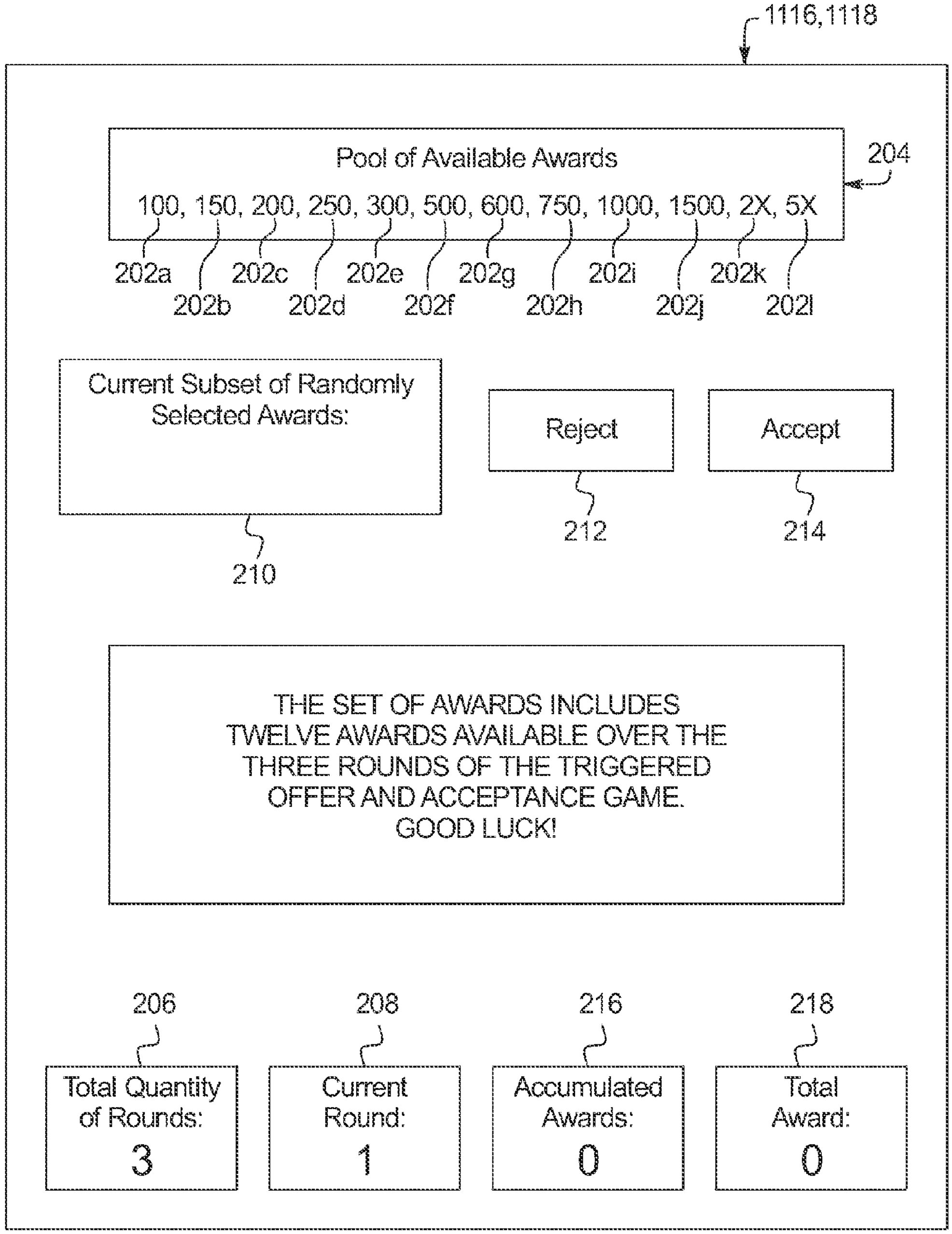

For example, as seen in FIG. 2A, for the triggered offer and acceptance game, the gaming system displays a plurality of awards 202 in the pool of available awards 204. Specifically, the gaming system displays the pool of available awards 204 including: (i) an award value of one-hundred credits 202*a*, (ii) an award value of one-hundred-fifty credits 202*b*, (iii) an award value of two-hundred credits 202*c*, (iv) an award value of two-hundred-fifty credits 202*d*, (v) an award value of three-hundred credits 202*e*, (vi) an award value of five-hundred credits 202*f*, (vii) an award value of six-hundred credits 202*g*, (viii) an award value of seven-hundred-fifty credits 202*h*, (ix) an award value of one-thousand credits 202*i*, (x) an award value of one-thousand-five-hundred credits 202*j*, (xi) an award modifier of 2× 202*k*, and (xii) an award modifier of 5× 202*l*. In this example, since the offer and acceptance game includes a total of three rounds (as indicated by total round indicator 206) wherein one of the awards of the pool of available awards is accumulated for each round, this play of the offer and acceptance game is associated with a maximum award of fifteen-thousand credits if the player accumulates the award value of one-thousand-five-hundred credits 202*j*, the award modifier of 2× 202*k*, and the award modifier of 5× 202*l* (i.e., 1500 credits×2××5×). In this example, the gaming system provides appropriate messages such as “THE SET OF AWARDS INCLUDES TWELVE AWARDS AVAILABLE OVER THE THREE ROUNDS OF THE TRIGGERED OFFER AND ACCEPTANCE GAME” and “GOOD LUCK” to the player visually, or through suitable audio or audiovisual displays.

Figure 2B:
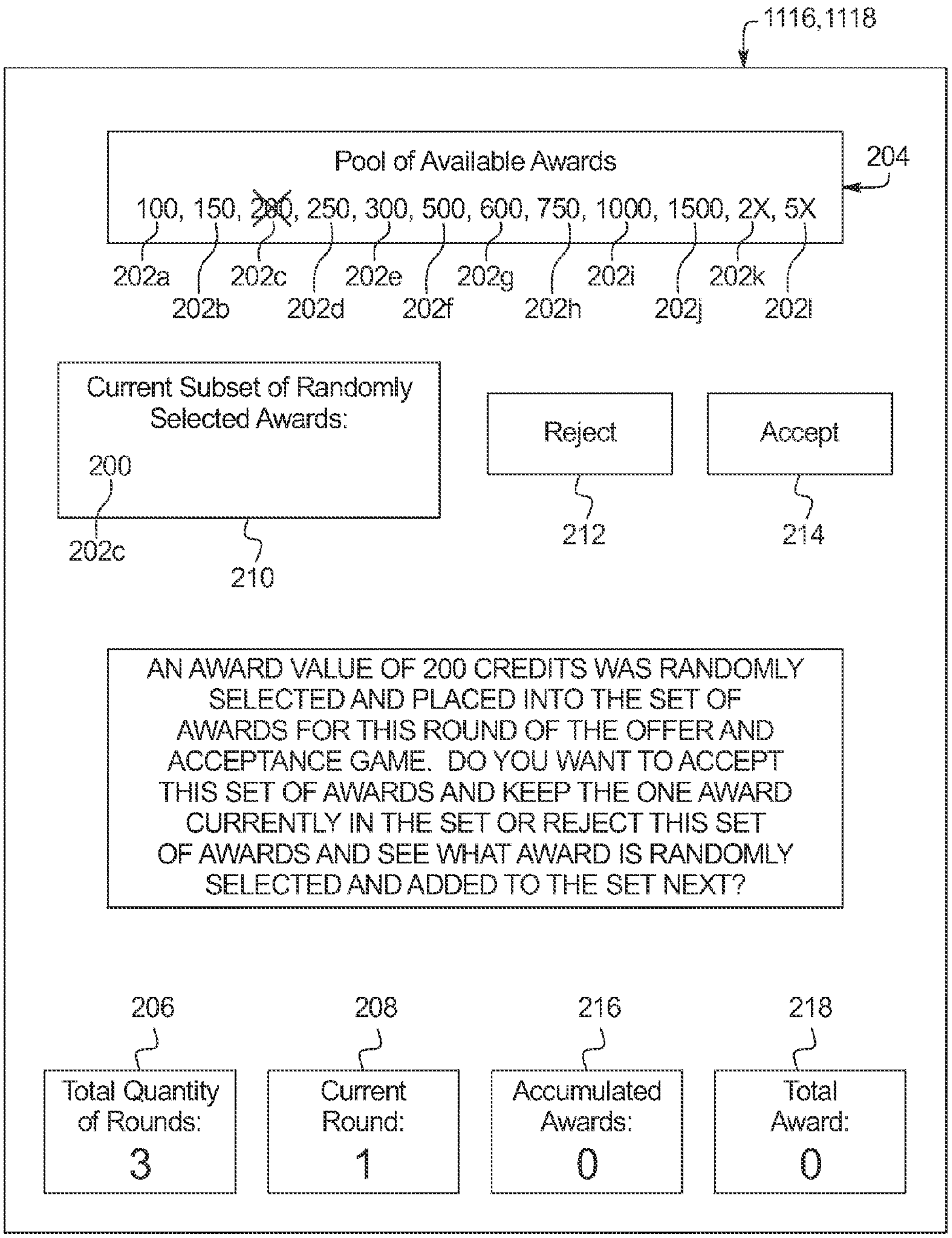

As seen in FIG. 2B, for the first round of the triggered offer and acceptance game (as indicated by current round indicator 208), the gaming system randomly selects, from the pool of available awards 204, the award of two-hundred credits 202*c*. The gaming system removes the randomly selected award of two-hundred credits 202*c* from the pool of available awards 204 (as indicated by the crossed-out award of two-hundred credits 202*c* in the pool of available awards 204). In this example, the removal of the randomly selected award of two-hundred credits 202*c* from the pool of available awards 204 provides that the award of two-hundred credits 202*c* may not be selected again from the pool of available awards for the duration of the triggered offer and acceptance game. The gaming system of this example also forms a subset of randomly selected awards 210 (including this randomly selected award of two-hundred credits 202*c*). In this example, the gaming system provides appropriate messages such as “AN AWARD VALUE OF 200 CREDITS WAS RANDOMLY SELECTED AND PLACED INTO THE SET OF AWARDS FOR THIS ROUND OF THE OFFER AND ACCEPTANCE GAME” to the player visually, or through suitable audio or audiovisual displays. As also seen in FIG. 2B, since the randomly selected award of two-hundred credits 202*c* is not a final award for the first round of the offer and acceptance game (i.e., a plurality of awards 202 remain available in the pool of available awards 204), the gaming system offers the formed subset to the player to accept or reject. In this example, the gaming system provides appropriate messages such as “DO YOU WANT TO ACCEPT THIS SET OF AWARDS AND KEEP THE ONE AWARD CURRENTLY IN THE SET OR REJECT THIS SET OF AWARDS AND SEE WHAT AWARD IS RANDOMLY SELECTED AND ADDED TO THE SET NEXT?” to the player visually, or through suitable audio or audiovisual displays.

Figure 2C:
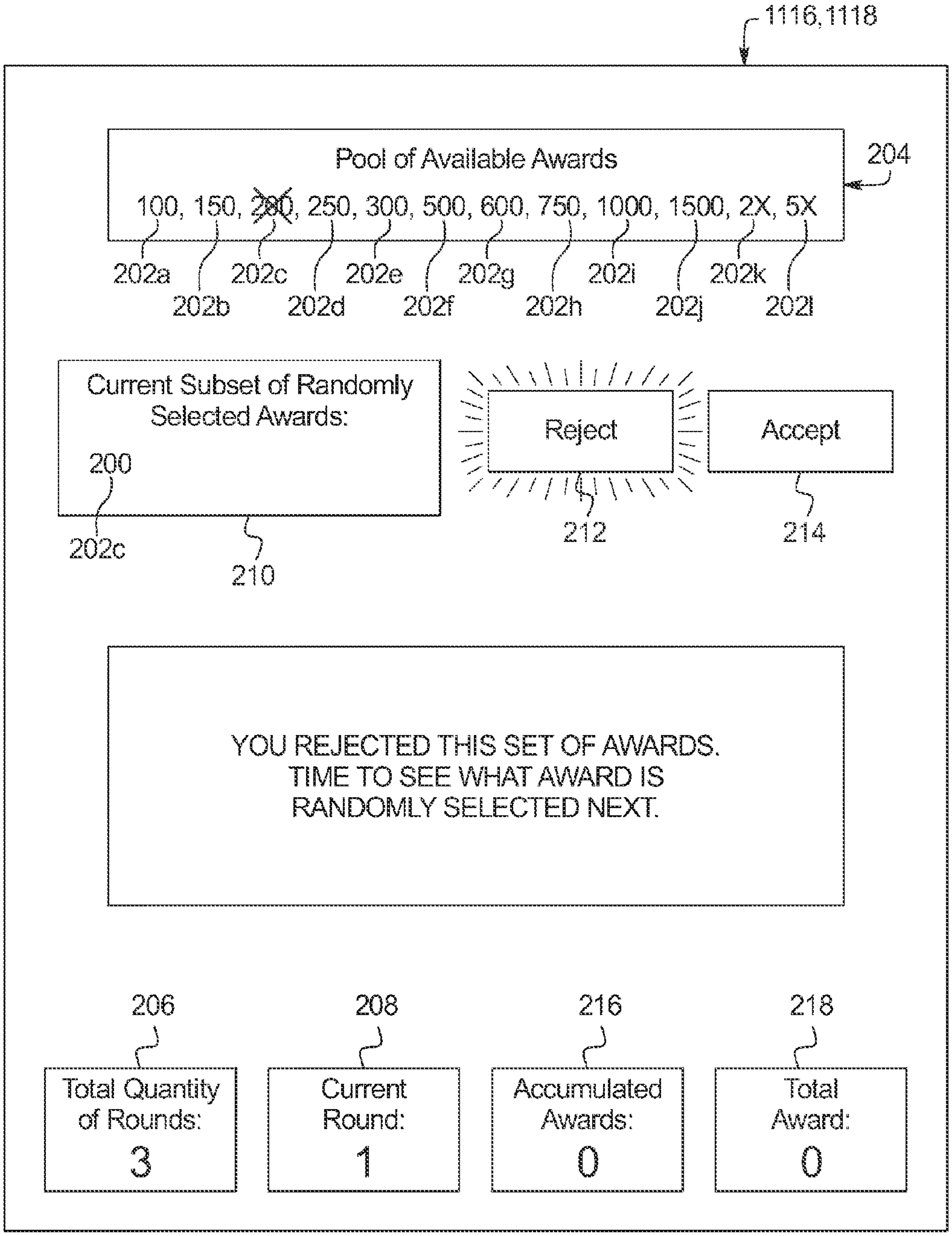

As seen in FIG. 2C, using the reject input 212, the player of this example rejected the offered formed subset including the randomly selected award of two-hundred credits 202*c*. That is, based on the relatively small value of the randomly selected award and based on the values of the awards still available in the pool of available awards, the player decided to reject this drawn award and to continue with the random selection of awards from the pool. In this example, the gaming system provides appropriate messages such as “YOU REJECTED THIS SET OF AWARDS” and TIME TO SEE WHAT AWARD IS RANDOMLY SELECTED NEXT" to the player visually, or through suitable audio or audiovisual displays.

Figure 2D:
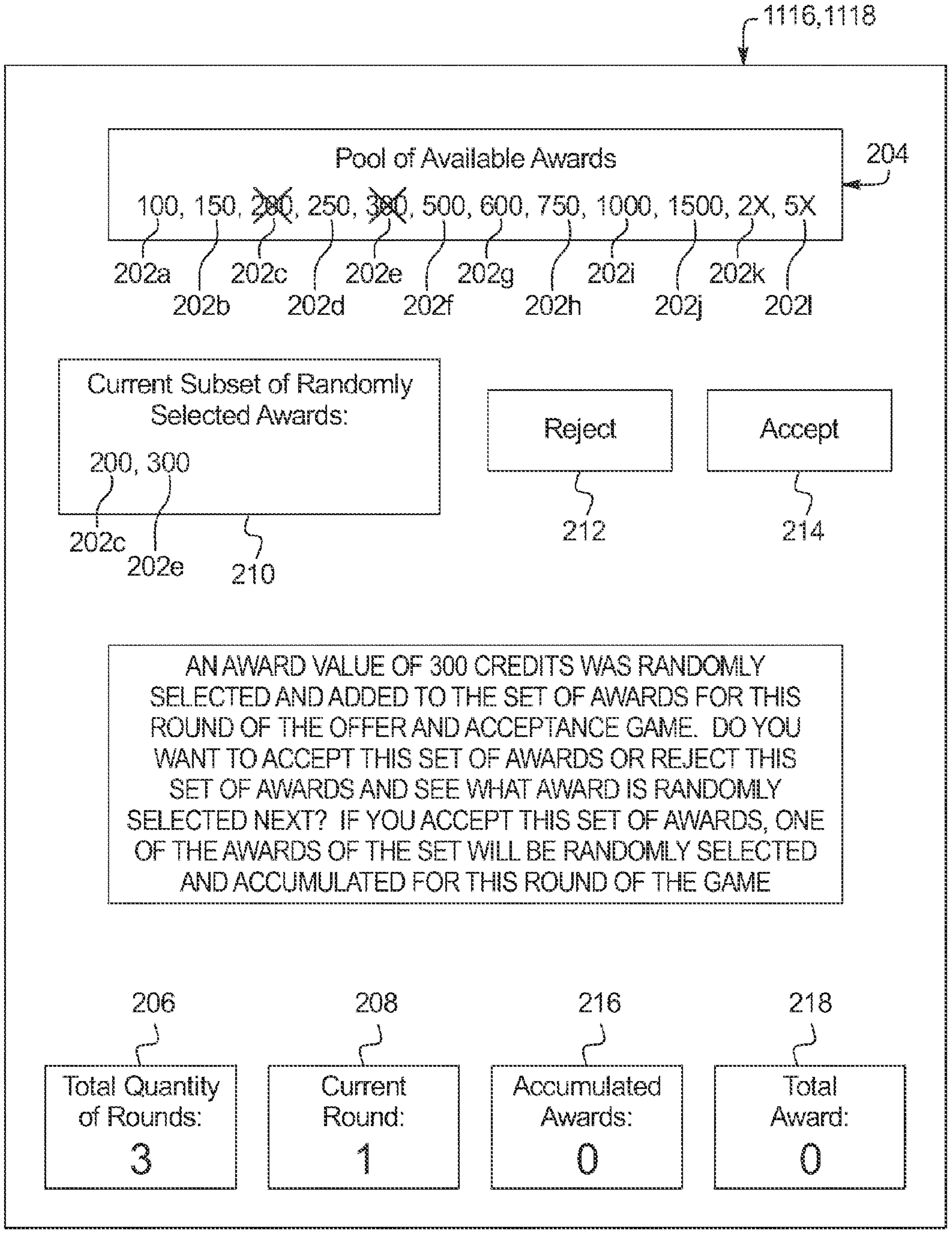

As seen in FIG. 2D, following the rejection of the formed subset of awards including the randomly selected award of two-hundred credits 202*c*, the gaming system randomly selects, from the pool of available awards 204, the award of three-hundred credits 202*e*. It should be appreciated that since the previously randomly selected award of two-hundred credits 202*c* was previously removed from the pool of available awards 204 (as still indicated by the crossed-out award of two-hundred credits 202*c* in the pool of available awards 204), this removed award remains unavailable for random selection during this play of the offer and acceptance game.

As also seen in FIG. 2D, the gaming system removes the randomly selected award of three-hundred credits 202*e* from the pool of available awards 204 (as indicated by the crossed-out award of three-hundred credits 202*e* in the pool of available awards 204). In this example, the removal of the randomly selected award of three-hundred credits 202*e* from the pool of available awards 204 provides that the award of three-hundred credits 202*e* may not be selected again from the pool of available awards for the duration of the triggered offer and acceptance game.

As further seen in FIG. 2D, the gaming system of this example adds the randomly selected award of three-hundred credits 202*e* to the formed subset of randomly selected awards 210 resulting in the subset currently including the randomly selected award of two-hundred credits 202*c* and the randomly selected award of three-hundred credits 202*e*. In this example, the gaming system provides appropriate messages such as “AN AWARD VALUE OF 300 CREDITS WAS RANDOMLY SELECTED AND ADDED TO THE SET OF AWARDS FOR THIS ROUND OF THE OFFER AND ACCEPTANCE GAME” to the player visually, or through suitable audio or audiovisual displays.

As also seen in FIG. 20, since the randomly selected award of three-hundred credits 202*e* is not a final award for the first round of the offer and acceptance game (i.e., a plurality of awards 202 remain available in the pool of available awards 204), the gaming system offers the formed subset to the player to accept or reject. In this example, the gaming system provides appropriate messages such as “DO YOU WANT TO ACCEPT THIS SET OF AWARDS OR REJECT THIS SET OF AWARDS AND SEE WHAT AWARD IS RANDOMLY SELECTED NEXT?” and IF YOU ACCEPT THIS SET OF AWARDS, ONE OF THE AWARDS OF THE SET WILL BE RANDOMLY SELECTED AND ACCUMULATED FOR THIS ROUND OF THE GAME" to the player visually, or through suitable audio or audiovisual displays.

Figure 2E:
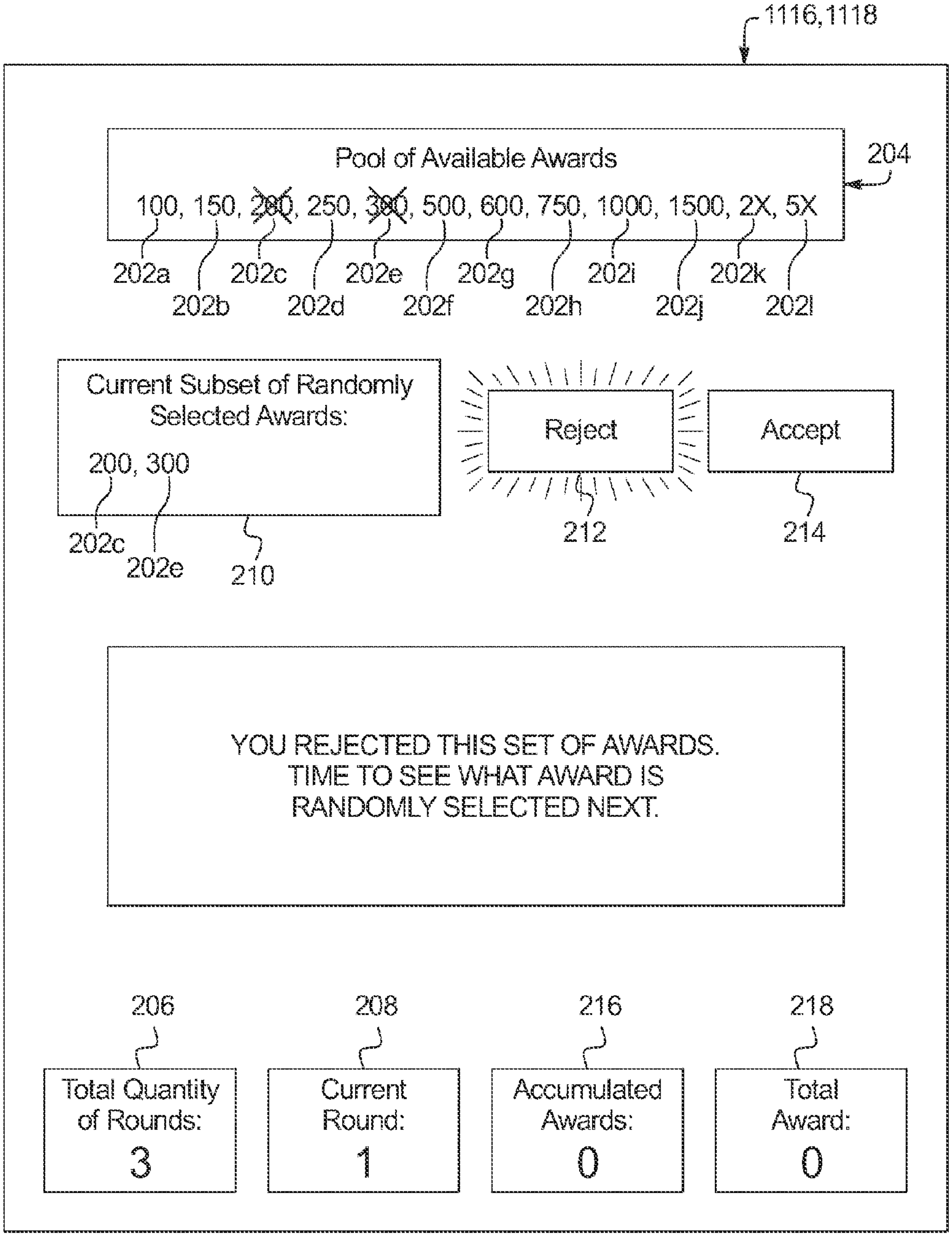

As seen in FIG. 2E, using the reject input 212, the player of this example rejected the offered formed subset including the randomly selected awards of two-hundred credits 202*c* and three-hundred credits 202*e*. That is, based on the relatively small value of the randomly selected award and based on the values of the awards still available in the pool of available awards, the player decided to reject the formed subset including two relatively small valued awards and to continue with the random selection of awards from the pool. In this example, the gaming system provides appropriate messages such as “YOU REJECTED THIS SET OF AWARDS” and "TIME TO SEE WHAT AWARD IS RANDOMLY SELECTED NEXT" to the player visually, or through suitable audio or audiovisual displays.

Figure 2F:
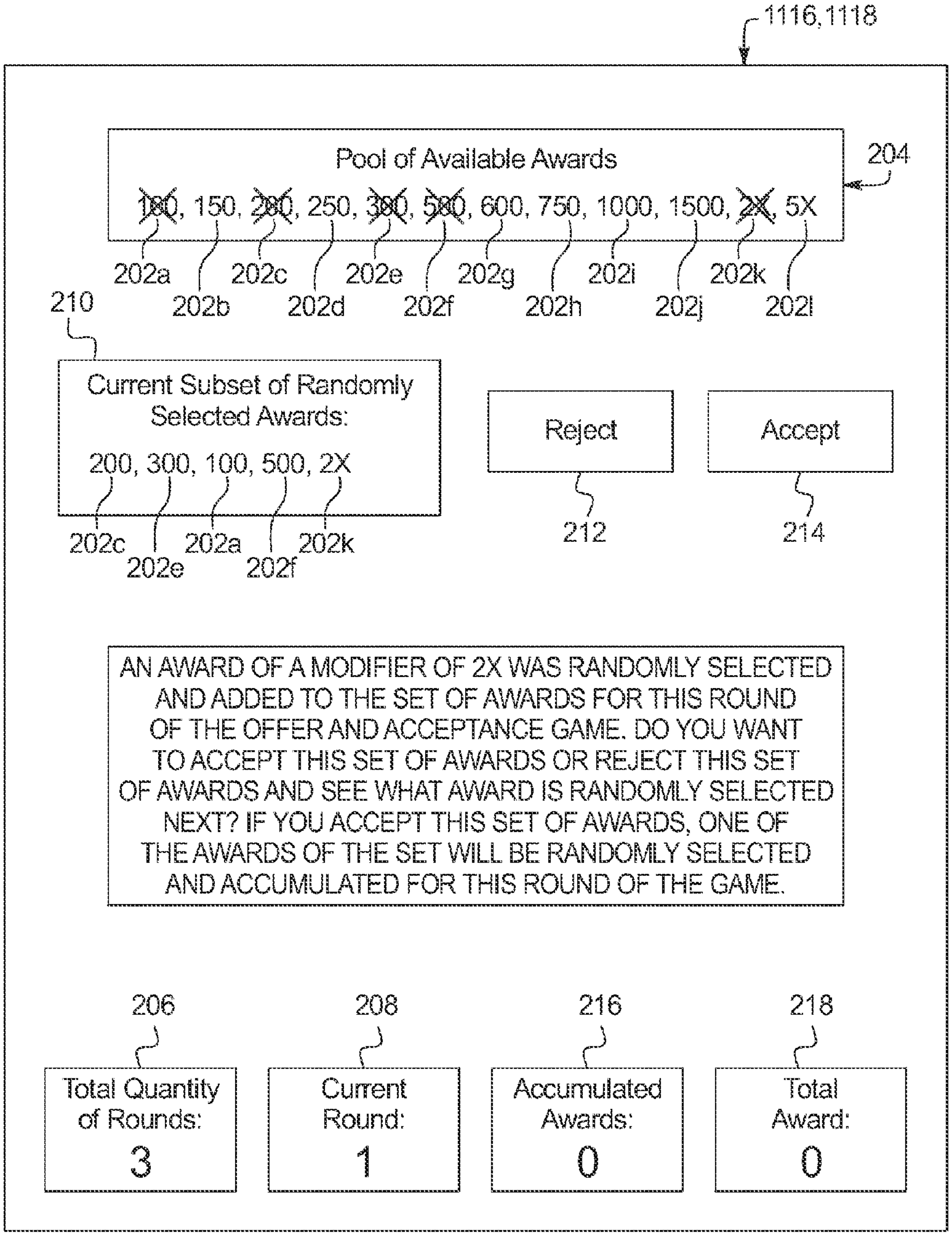

As seen in FIG. 2F, following the random selection of the awards of one-hundred credits 202*a* and five-hundred credits 202*f* (not shown) and the rejection of the subset of awards including: (i) the randomly selected award of two-hundred credits 202*c*, the randomly selected award of three-hundred credits 202*e* and the randomly selected award of one-hundred credits 202*a*, and (ii) the randomly selected award of two-hundred credits 202*c*, the randomly selected award of three-hundred credits 202*e*, the randomly selected award of one-hundred credits 202*a* and the randomly selected award of five-hundred credits 202*f* (not shown), the gaming system randomly selects, from the pool of available awards 204, the award of award modifier of 2× 202*k*. It should be appreciated that since the previously randomly selected awards of two-hundred credits 202*c*, three-hundred credits 202*e*, one-hundred credits 202*a* and five-hundred credits 202*f* were previously removed from the pool of available awards 204, these removed awards remain unavailable for random selection during this play of the offer and acceptance game.

As also seen in FIG. 2F, the gaming system removes the randomly selected award of the award modifier of 2× 202*k* from the pool of available awards 204 (as indicated by the crossed-out award of the award modifier of 2× 202*k* in the pool of available awards 204). In this example, the removal of the randomly selected award of an award modifier of 2× 202*k* from the pool of available awards 204 provides that the award of the award modifier of 2× 202*k* may not be selected again from the pool of available awards for the duration of the triggered offer and acceptance game.

As further seen in FIG. 2F, the gaming system of this example adds the randomly selected award of the award modifier of 2× 202*k* to the formed subset of randomly selected awards 210 resulting in the subset currently including the randomly selected awards of; two-hundred credits 202*c*, three-hundred credits 202*e*, one-hundred credits 202*a*, five-hundred credits 202*f* and the award modifier of 2× 202*k*. In this example, the gaming system provides appropriate messages such as "AN AWARD OF A MODIFIER OF 2×WAS RANDOMLY SELECTED AND ADDED TO THE SET OF AWARDS FOR THIS ROUND OF THE OFFER AND ACCEPTANCE GAME" to the player visually, or through suitable audio or audiovisual displays.

As also seen in FIG. 2F, since the randomly selected award of the award modifier of 2× 202*k* is not a final award for the first round of the offer and acceptance game (i.e., a plurality of awards 202 remain available in the pool of available awards 204), the gaming system offers the formed subset to the player to accept or reject. In this example, the gaming system provides appropriate messages such as "DO YOU WANT TO ACCEPT THIS SET OF AWARDS OR REJECT THIS SET OF AWARDS AND SEE WHAT AWARD IS RANDOMLY SELECTED NEXT?" and IF YOU ACCEPT THIS SET OF AWARDS, ONE OF THE AWARDS OF THE SET WILL BE RANDOMLY SELECTED AND ACCUMULATED FOR THIS ROUND OF THE GAME" to the player visually, or through suitable audio or audiovisual displays.

Figure 2G:
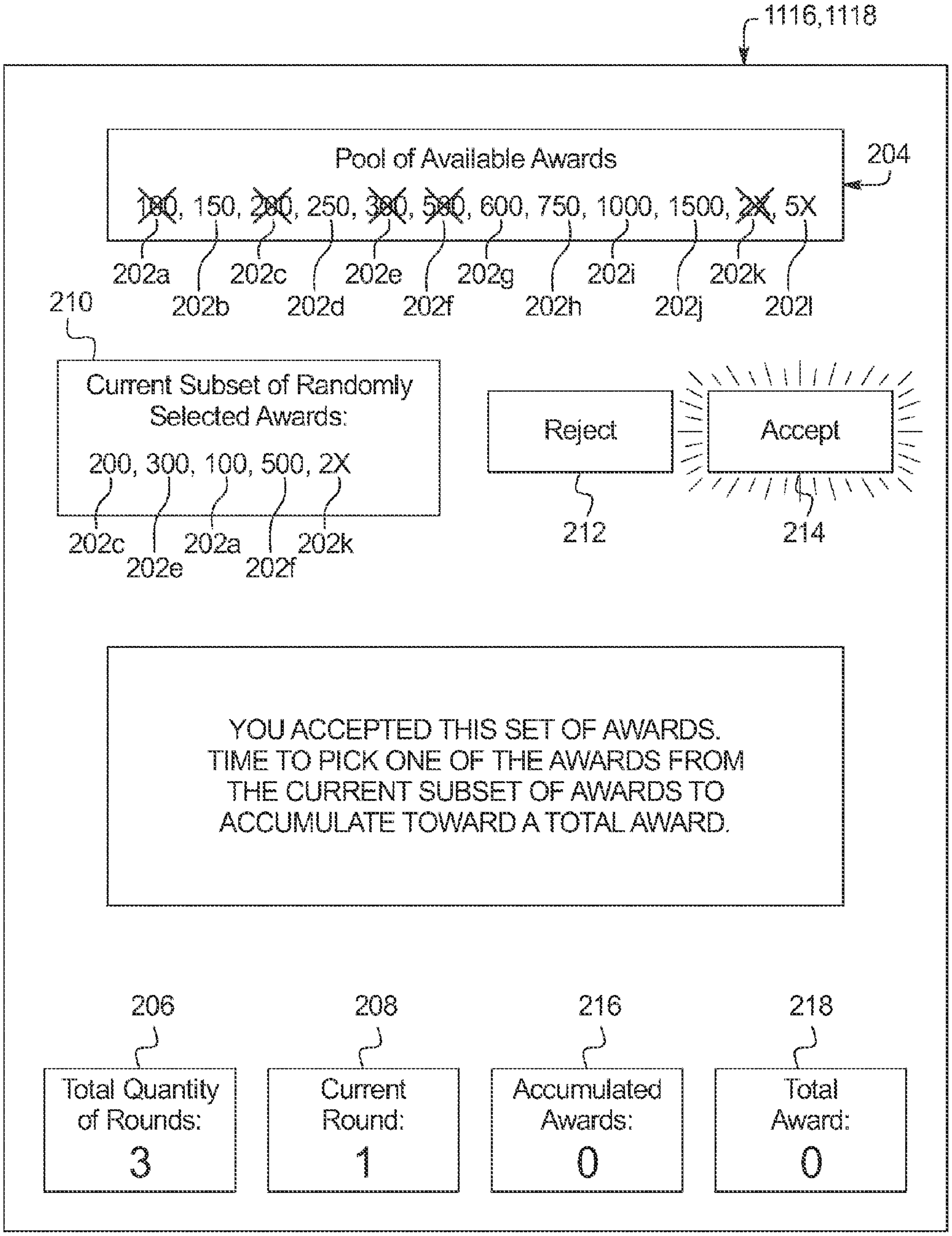

As seen in FIG. 2G, using the accept input 214, the player of this example accepted the offered formed subset including the randomly selected awards of: two-hundred credits 202*c*, three-hundred credits 202*e*, one-hundred credits 202*a*, five-hundred credits 202*f* and the award modifier of 2× 202*k*. That is, based on the subset of awards including the lucrative awards of five-hundred credits 202*f* and the award modifier of 2× 202*k*, the player decided to accept the formed subset in hopes of obtaining one of these two lucrative awards. Each of the awards of the formed subset of awards of this example have an equal probably of being randomly selected such that each of the awards have a 20% (i.e. ⅕) probability of being selected and accumulated for the first round of the offer and acceptance game. In this example, the gaming system provides appropriate messages such as "YOU ACCEPTED THIS SET OF AWARDS" and "TIME TO PICK ONE OF THE AWARDS FROM THE CURRENT SUBSET OF AWARDS TO ACCUMULATE TOWARD A TOTAL AWARD" to the player visually, or through suitable audio or audiovisual displays.

Figure 2H:
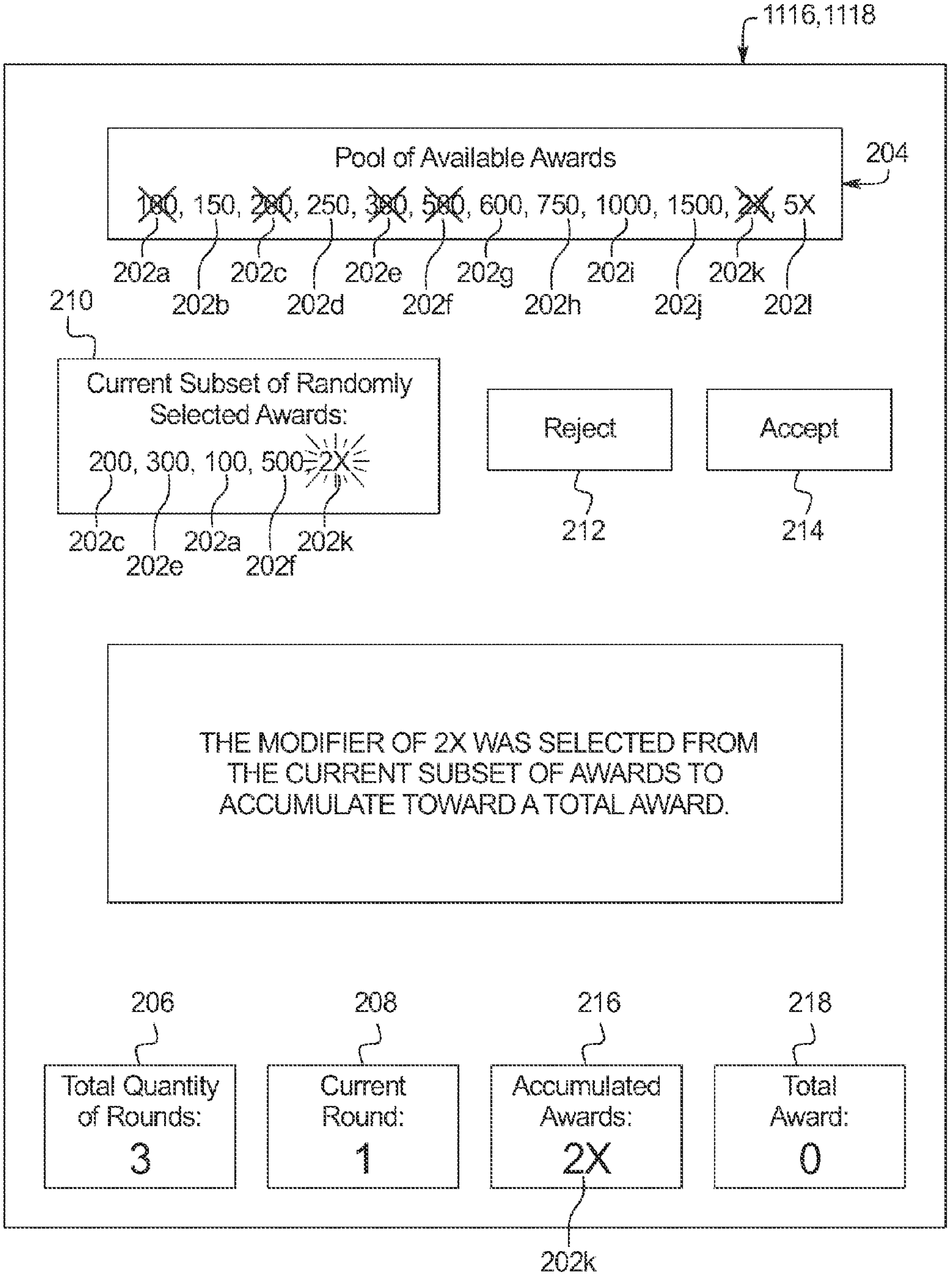

As seen in FIG. 2H, in association with the player's acceptance of the offered formed subset, the gaming system randomly selects the award modifier of 2× 202*k*. As indicated in the accumulated awards indicator 216, the gaming system then accumulates the randomly selected award modifier of 2× 202*k*. In this example, the gaming system provides appropriate messages such as THE MODIFIER OF 2× WAS SELECTED FROM THE CURRENT SUBSET OF AWARDS TO ACCUMULATE TOWARD A TOTAL AWARD" to the player visually, or through suitable audio or audiovisual displays.

Figure 2I:
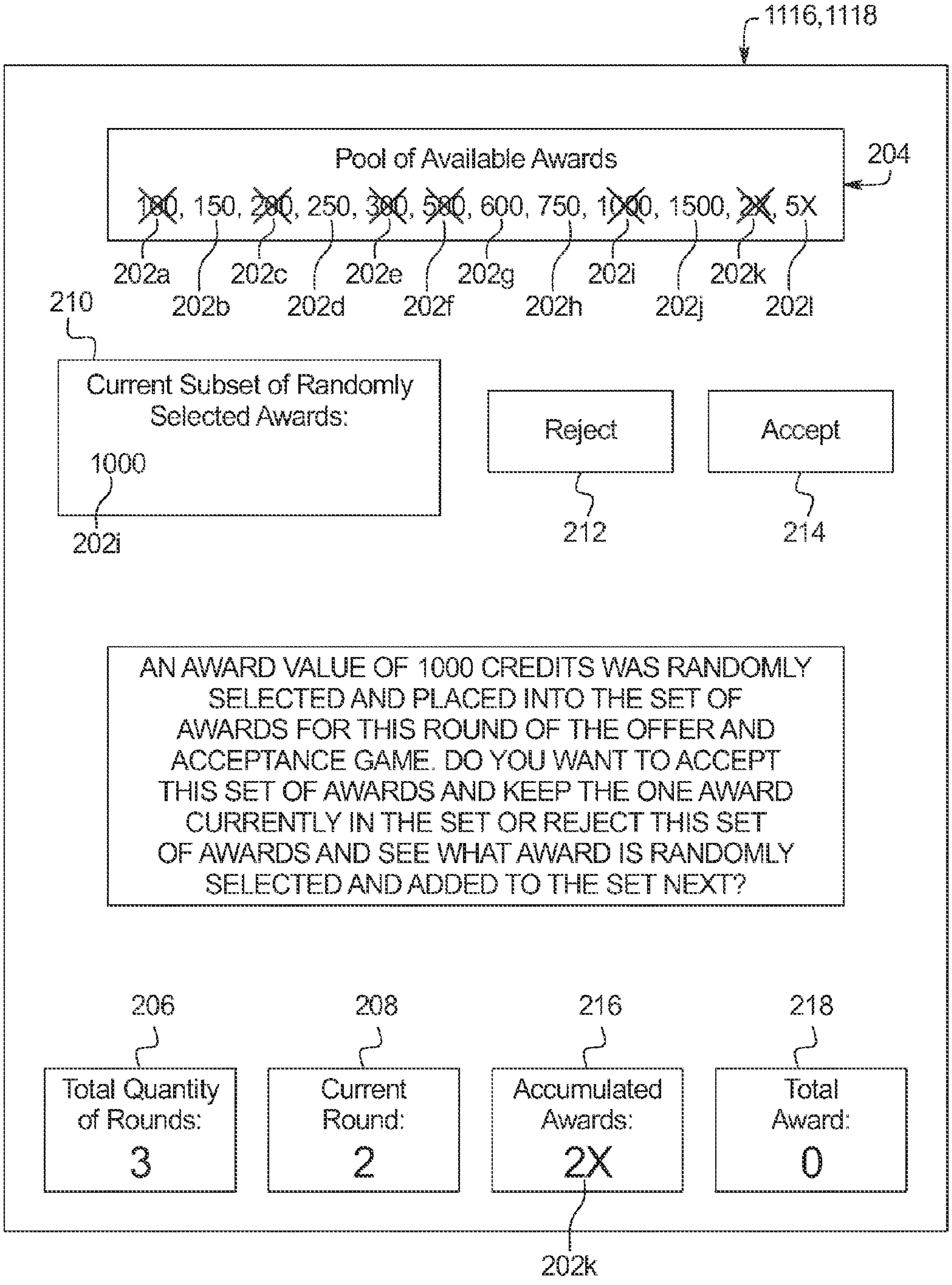

Turning to FIG. 2I, after determining that the first round of the triggered offer and acceptance game is not a final round, the gaming system advances to the second round (as indicated by current round indicator 208), the gaming system randomly selects, from the pool of available awards 204, the award of one-thousand credits 202*i*. The gaming system removes the randomly selected award of one-thousand credits 202*i* from the pool of available awards 204 (as indicated by the crossed-out award of one-thousand credits 202*i* in the pool of available awards 204). In this example, the removal of the randomly selected award of one-thousand credits 202*i* from the pool of available awards 204 provides that the award of one-thousand credits 202*i* may not be selected again from the pool of available awards for the duration of the triggered offer and acceptance game. It should be appreciated that since the previously randomly selected awards of two-hundred credits 202*c*, three-hundred credits 202*e*, one-hundred credits 202*a*, five-hundred credits 202*f* and the award modifier of 2× 202*k* were previously removed from the pool of available awards 204 in the previous round, these removed awards remain unavailable for random selection during this play of the offer and acceptance game.

As also seen in FIG. 2I, the gaming system of this example also forms a subset of randomly selected awards 210 (including this randomly selected award of one-thousand credits 202*i*). It should be appreciated that since the random selection of an award of one-thousand credits 202*i* occurred in a different round than the previous random selections of awards from the pool of awards, the gaming forms another subset of awards for the different round of the offer and acceptance game. Accordingly, the offer and acceptance game of this example utilizes the same pool of awards for each round of the game while utilizing different subsets of awards for each round of the game. In this example, the gaming system provides appropriate messages such as "AN AWARD VALUE OF 1000 CREDITS WAS RANDOMLY SELECTED AND PLACED INTO THE SET OF AWARDS FOR THIS ROUND OF THE OFFER AND ACCEPTANCE GAME" to the player visually, or through suitable audio or audiovisual displays.

As also seen in FIG. 2I, since the randomly selected award of one-thousand credits 202*i* is not a final award for the second round of the offer and acceptance game (i.e., a plurality of awards 202 remain available in the pool of available awards 204), the gaming system offers the formed subset to the player to accept or reject. In this example, the gaming system provides appropriate messages such as "DO YOU WANT TO ACCEPT THIS SET OF AWARDS AND KEEP THE ONE AWARD CURRENTLY IN THE SET OR REJECT THIS SET OF AWARDS AND SEE WHAT AWARD IS RANDOMLY SELECTED AND ADDED TO THE SET NEXT?" to the player visually, or through suitable audio or audiovisual displays.

Figure 2J:
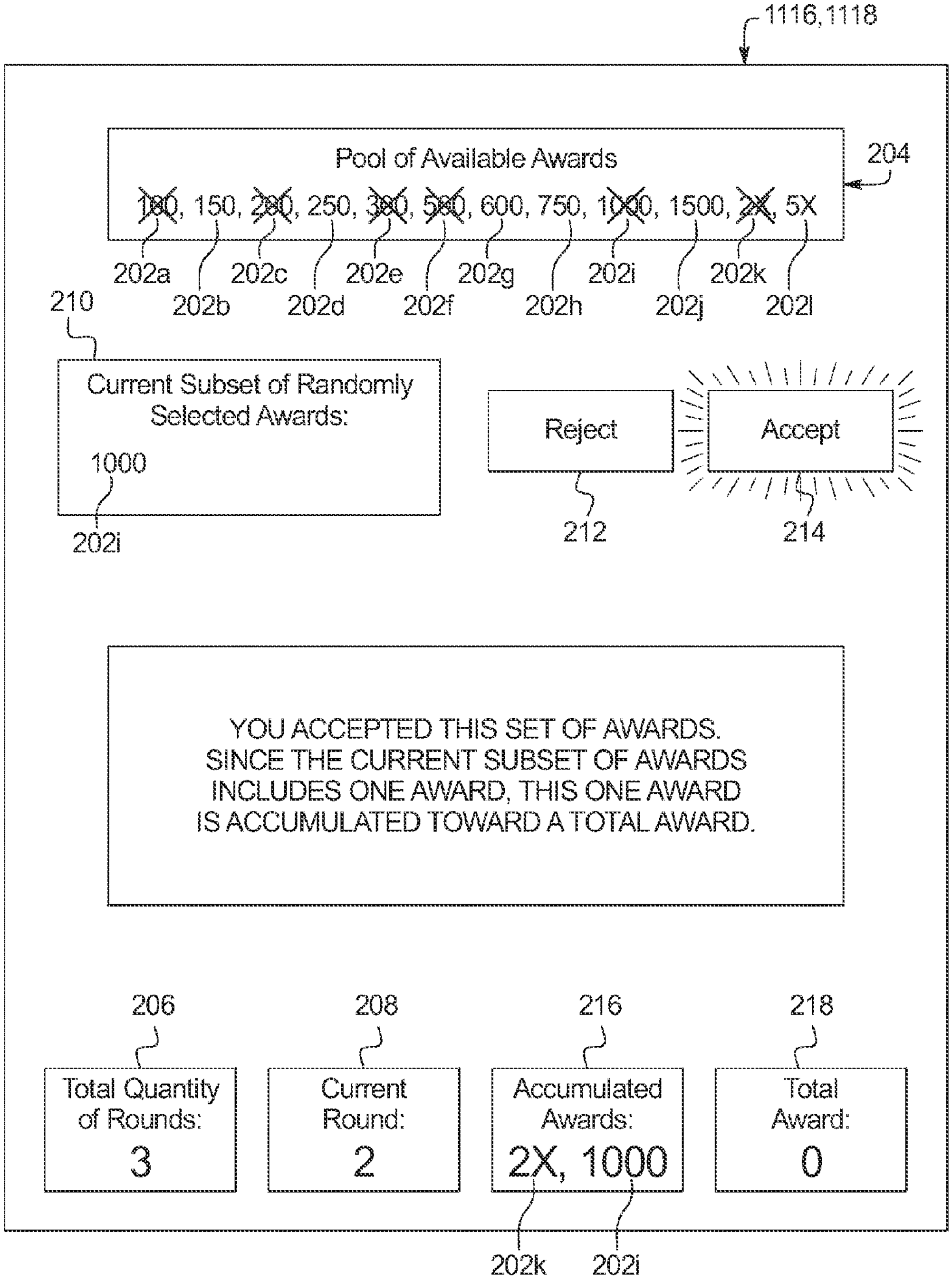

As seen in FIG. 2J, using the accept input 214, the player of this example accepted the offered formed subset including the randomly selected award of one-thousand credits 202*i*. That is, based on the subset of awards including the lucrative award of one-thousand credits 202*i*, the player decided to accept this award and proceed to the next round. In this example, the single award of one-thousand credits 202*i* has a 100% (i.e. 1/1) probability of being selected and accumulated for the second round of the offer and acceptance game. Accordingly, in association with the player's acceptance of the offered formed subset and as indicated in the accumulated awards indicator 216, the gaming system accumulates the award of one-thousand credits 202*i*. In this example, the gaming system provides appropriate messages such as "YOU ACCEPTED THIS SET OF AWARDS" and "SINCE THE CURRENT SUBSET OF AWARDS INCLUDES ONE AWARD, THIS ONE AWARD IS ACCUMULATED TOWARD A TOTAL AWARD" to the player visually, or through suitable audio or audiovisual displays.

Figure 2K:
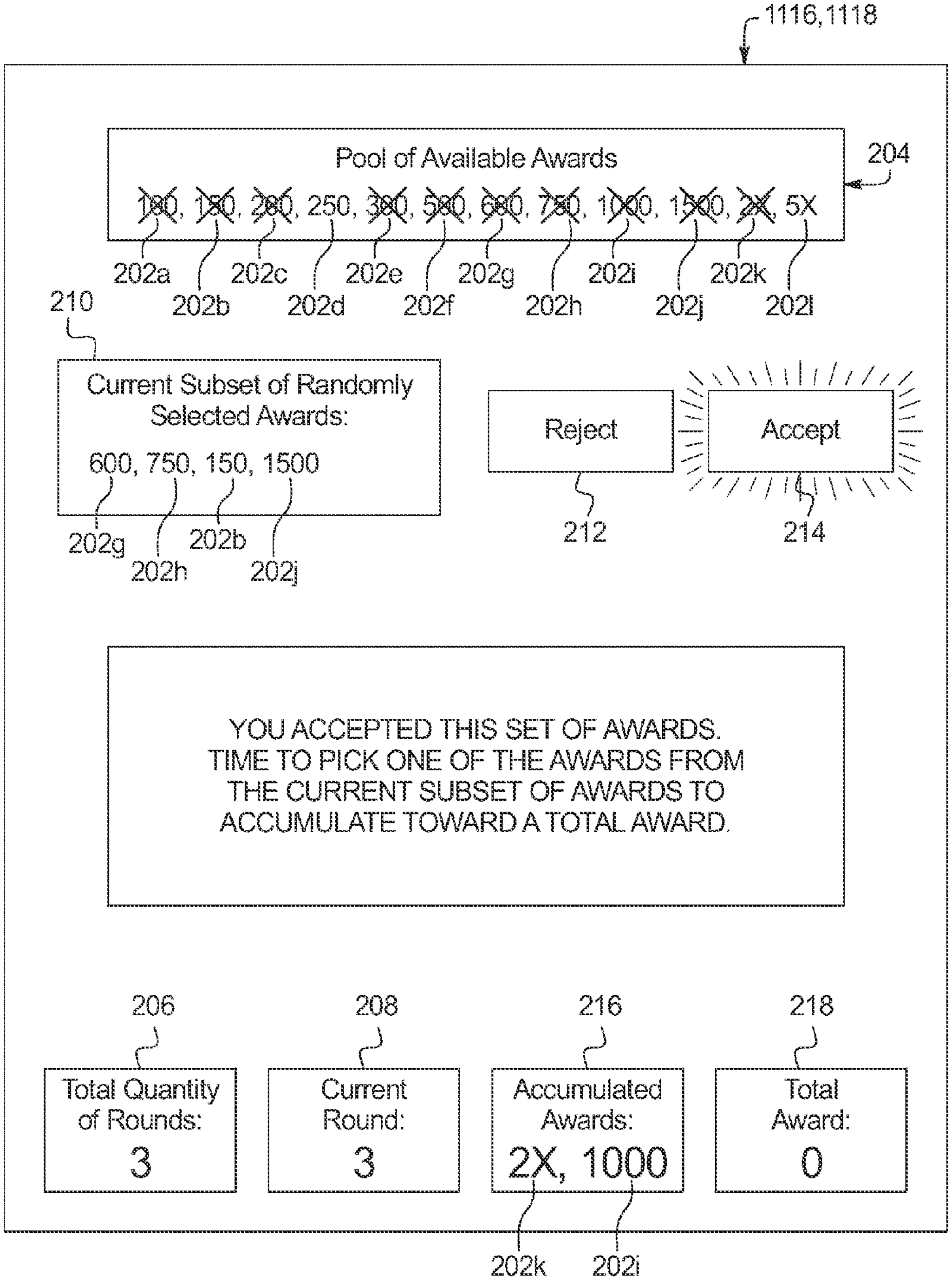

Turning to FIG. 2K, after: (a) determining that the second round of the triggered offer and acceptance game is not a final round, the gaming system advances to the third round (as indicated by current round indicator 208); (b) the random selections and removals from the pool 204 of the awards of six-hundred credits 202*g*, seven-hundred-fifty credits 202*h*, one-hundred-fifty credits 202*b* and one-thousand-five-hundred credits 202*j* (not shown) and (c) the rejection of the formed subsets of awards 210 including: (i) six-hundred credits 202*g*, (ii) six-hundred credits 202*g* and seven-hundred-fifty credits 202*h*, (iii) six-hundred credits 202*g*, seven-hundred-fifty credits 202*h*, and one-hundred-fifty credits 202*b* (also not shown), using the accept input 214, the player of this example accepted the offered formed subset including the randomly selected awards of: six-hundred credits 202*g*, seven-hundred-fifty credits 202*h*, one-hundred-fifty credits 202*b* and one-thousand-five-hundred credits 202*j*. Each of the awards of the formed subset of awards of this example have an equal probably of being randomly selected such that each of the awards have a 25% (i.e. ¼) probability of being selected and accumulated for the second round of the offer and acceptance game. In this example, the gaming system provides appropriate messages such as YOU ACCEPTED THIS SET OF AWARDS" and "TIME TO PICK ONE OF THE AWARDS FROM THE CURRENT SUBSET OF AWARDS TO ACCUMULATE TOWARD A TOTAL AWARD" to the player visually, or through suitable audio or audiovisual displays.

Figure 2L:
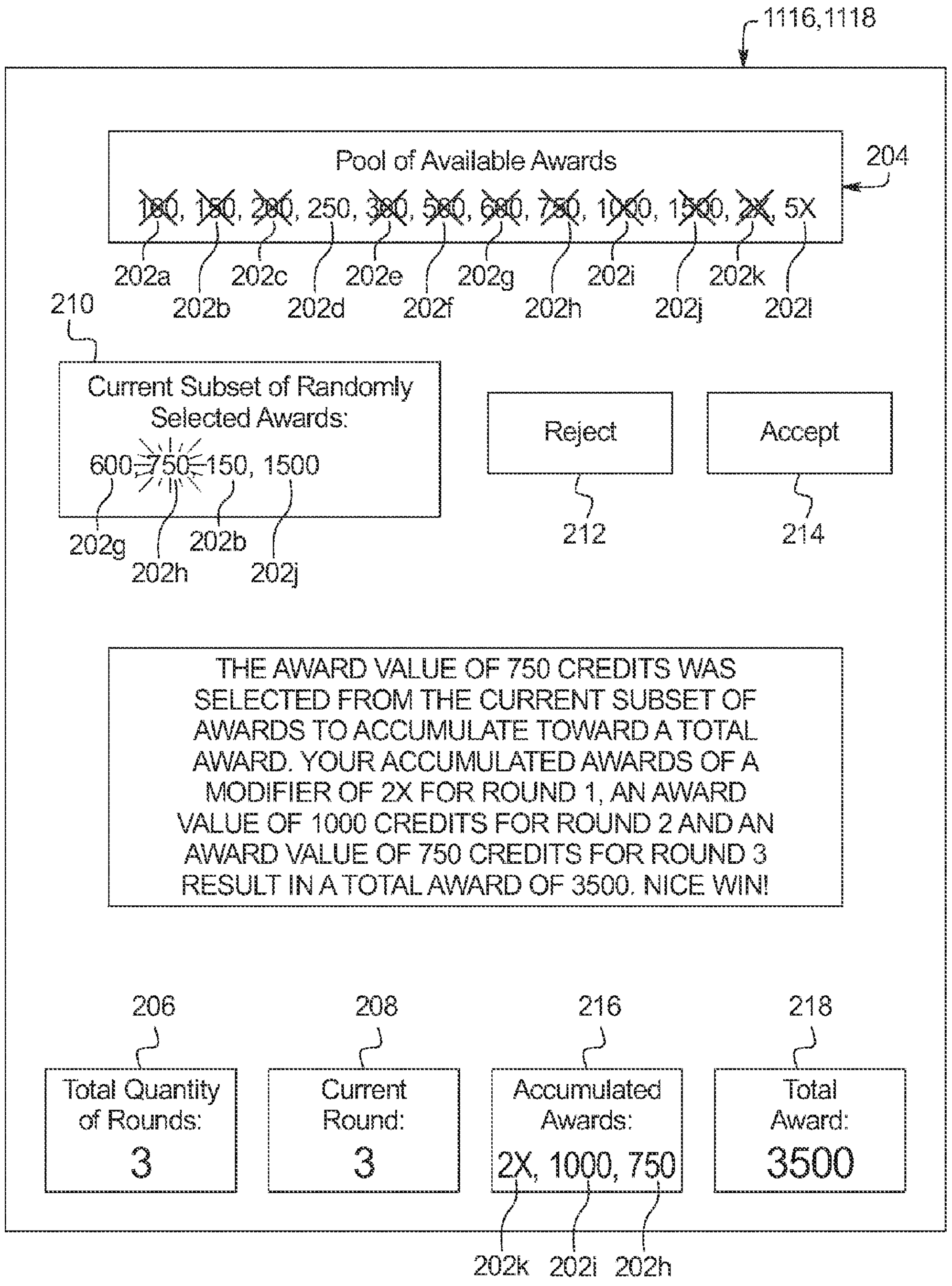

As seen in FIG. 2L, in association with the player's acceptance of the offered formed subset, the gaming system randomly selects the award of seven-hundred-fifty credits 202*h*. As indicated in the accumulated awards indicator 216, the gaming system then accumulates the randomly selected award of seven-hundred-fifty credits 202*h*. In this example, the gaming system provides appropriate messages such as "THE AWARD VALUE OF 750 CREDITS WAS SELECTED FROM THE CURRENT SUBSET OF AWARDS" TO ACCUMULATE TOWARD A TOTAL AWARD" to the player visually, or through suitable audio or audiovisual displays.

As further seen in FIG. 2L, since the accumulation of the award of seven-hundred-fifty credits 202*h* concludes the third and final round of the offer and acceptance game, the gaming system determines a total offer and acceptance game award based on the accumulated awards over the three rounds of the offer and acceptance game. Specifically, the gaming system determines a total award of three-thousand-five-hundred credits (or ((1000 credits+750 credits)×2×). As indicated in total award indicator 218, the gaming system displays this determined total award to the player and concludes or terminates the play of the multiple round offer and acceptance game. In this example, the gaming system provides appropriate messages such as "YOUR ACCUMULATED AWARDS OF A MODIFIER OF 2×FOR ROUND 1, AN AWARD VALUE OF 1000 CREDITS FOR ROUND 2 AND AN AWARD VALUE OF 750 CREDITS FOR ROUND 3 RESULT IN A TOTAL AWARD OF 3500" and "NICE WIN" to the player visually, or through suitable audio or audiovisual displays.

In one embodiment, the gaming system utilizes one pool of available awards for each play of the offer and acceptance game. In another embodiment, the gaming system maintains a plurality of pools of available awards wherein the gaming system selects one of such maintained pools for each play of the offer and acceptance game. It should be appreciated that while this embodiment includes different pools of available awards for different plays of the offer and acceptance game, the gaming system continues displaying one, more or each of the available awards to the player.

In one embodiment, as described above, each award of the subset of awards has a equal or substantially equal probability of being selected and accumulated. In another embodiment, a plurality of the awards of the subset of awards have different probabilities of being selected and accumulated. In another embodiment, each of the awards of the subset of awards have different probabilities of being selected and accumulated. In certain of these embodiments, the probability of one or more awards being selected is based on an amount of the award. In certain of these embodiments, the probability of one or more awards being selected is based on an order of selection of the award.

In one embodiment, one or more of the awards of the pool of available awards are associated with an advance to another pool of available awards. That is, if such an award is accumulated, the gaming system replaces the currently utilized pool of available awards with a different, more lucrative pool of available awards.

In another embodiment, one or more of the awards of the pool of available awards are associated with one or more previously removed awards being reintroduced or added back into the pool of available awards. In one such embodiment, if a designated randomly selected award, such as a relatively low valued award, is accumulated for a round of the offer and acceptance game, the gaming system randomly selects one or more of the previously removed awards and reintroduces or adds such previously removed awards to the pool of available awards. In another such embodiment, if a designated randomly selected award, such as a relatively low valued award, is accumulated for a round of the offer and acceptance game, the gaming system randomly selects the highest valued previously removed award(s) and reintroduces or adds such previously removed award(s) to the pool of available awards. In another embodiment, at the end of one, more or each of the rounds of the offer and acceptance game, the gaming system reintroduces or adds one or more previously removed randomly selected awards back into the pool of available awards. In another embodiment, at the end of one, more or each of the rounds of the offer and acceptance game, the gaming system reintroduces or adds each of the previously removed randomly selected awards (minus the accumulated award) back into the pool of available awards.

In another embodiment, one or more of the awards of the pool of available awards are associated with one or more other awards from the pool of available awards. In one such embodiment, if a designated randomly selected award, such as a relatively low valued award, is accumulated for a round of the offer and acceptance game, the gaming system replaces that accumulated award with another award, such as a more lucrative award, for that round of the offer and acceptance game.

In one embodiment, as described above, the gaming system provides the player a randomly selected award (as part of the total offer and acceptance game award) if the gaming system also selects and accumulates the randomly selected award from the formed subset of awards. In another embodiment, the gaming system provides the player a randomly selected award upon that award being randomly selected from the pool of awards. In this embodiment, if the gaming system also selects and accumulates the randomly selected award from the formed subset of awards, the gaming system again provides the player the randomly selected award as part of the total offer and acceptance game award.

In one embodiment, as described above, as long as at least one award remains available in the pool of awards to be selected (i.e., the current randomly selected award is not a final award), the gaming system enables the player to reject the currently selected award. In another embodiment, the gaming system requires that at least one award must be available in the pool of awards for each subsequent round of the offer and acceptance game. For example, if an offer and acceptance game includes four rounds and the player is currently playing the first round, the gaming system limits the quantity of awards the player may include in the subset of awards such that at least three awards remain in the pool of available awards (for the three subsequent rounds of the offer and acceptance game). In another embodiment, the gaming system limits the quantity of awards which may be randomly selected from the pool for a round to a designated quantity. In another embodiment, the gaming system provides that at least a designated quantity of awards are to be randomly selected from the pool of available awards for one or more rounds. It should be appreciated that such limitations may vary from round to round of the same offer and acceptance game or from play to play of the offer and acceptance game.

In one embodiment, as described above, the gaming system randomly selects awards one at a time from the pool of available awards. In another embodiment, the gaming system randomly selects a plurality of awards at a time from the pool of available awards. In one such embodiment, different rounds of the offer and acceptance game are associated with different quantities of awards randomly selected at a time from the pool of available awards. In another such embodiment, different selections from the pool of awards within the same round of the offer and acceptance game are associated with different quantities of awards randomly selected at a time from the pool of available awards.

In one embodiment, upon the conclusion of a play of the offer and acceptance game, the gaming system carries one or more unselected awards from the pool of available awards to a subsequent game. In this subsequent game, if the pool of available awards (including such carried over awards) is depleted in one round, the gaming system reshuffles the pool of available awards for one or more subsequent rounds.

In different embodiments, one or more of the awards of the pool are associated with award eliminators. In one such embodiment, if the gaming system selects an award from the pool of awards and the selected award is associated with an award eliminator, the gaming system removes the selected award and one or more additional awards from the pool of available awards.

In another such embodiment, if the gaming system selects an award from the pool of awards and the selected award is associated with an award eliminator, the gaming system removes one or more of the awards from the formed subset of randomly selected awards.

In different embodiments, one or more of the awards of the pool are associated with pool modifier. In one such embodiment, if the gaming system selects an award from the pool of awards and the selected award is associated with a pool modifier, the gaming system modifies the pool of available awards by changing one or more awards currently in the pool of available awards. In another such embodiment, if the gaming system selects an award from the pool of awards and the selected award is associated with a pool modifier, the gaming system modifies the pool of available awards by changing the quantity of awards currently in the pool of available awards.

In different embodiments, one or more of the awards of the pool are associated with subset modifier. In one such embodiment, if the gaming system selects an award from the pool of awards and the selected award is associated with a subset modifier, the gaming system modifies the formed subset of awards by changing one or more awards currently in the formed subset of awards. In another such embodiment, if the gaming system selects an award from the pool of awards and the selected award is associated with a subset modifier, the gaming system modifies the subset of awards by changing the quantity of awards currently in the subset of awards.

In another embodiment, in addition to randomly selecting one of the awards in the formed subset of awards to accumulate, the gaming system includes an ordinal value in the subset of awards, such as a highest award, a second highest value, a lowest award or a second lowest award in the subset of awards. For example, if the subset of awards includes the awards of an award value of one-thousand credits, an award value of five-hundred credits, an award value of three-hundred credits and an ordinal value of the highest value, the gaming system effectively provides the player two chances to accumulate the award of one-thousand credits. That is, if the gaming system randomly selects the award value of one-thousand credits or randomly selects the ordinal value of the highest value (which causes the highest value in the subset of awards (i.e., the award value of one-thousand credits) to be selected), the gaming system accumulates the same award for the player. In one such embodiment, if the player accepts a subset with only an ordinal value, such as a highest award, in the subset, the gaming system accumulates the highest of the awards remaining in the pool. In another such embodiment, if the player accepts a subset with only an ordinal value, such as a highest award, in the subset, since there are no other awards in the subset, the gaming system accumulates a consolation award or an award having a value of zero for the player. In another embodiment, one or more ordinal awards are associated with a particular type of award such as a highest valued award or a highest modifier award. In one such embodiment, if the player accepts a subset with such an ordinal award and the subset does not also include that particular award type, the gaming system accumulates a consolation award or an award having a value of zero for the player. For example, if the subset includes the awards of a 2× modifier, a 5× modifier and an ordinal awards of the highest valued award, and the gaming system selects the ordinal award, since the subset of awards includes no other valued awards, the gaming system accumulates a consolation award or an award having a value of zero for the player. In another such embodiment, if the player accepts a subset with such an ordinal award and the subset does not also include that particular award type, the gaming system accumulates an award remaining in the pool.

In another embodiment, an ordinal award is associated with a future round such as a highest award in the next round. In this embodiment, the gaming system removes such a future round ordinal award from the pool of awards (if the future round ordinal award is still available) after the second to last round of the offer and acceptance game.

In different embodiments, for various of the offer and acceptance games disclosed herein, one or more of the awards of the pool or set of awards includes, but are not limited to, one or more of:

(i) a quantity of monetary credits;
(ii) a quantity of non-monetary credits;
(iii) a quantity of promotional credits;
(iv) a quantity of player tracking points;
(v) a progressive award;
(vi) a modifier, such as a multiplier;
(vii) a quantity of free plays of one or more games;
(viii) a quantity of plays of one or more secondary or bonus games;
(ix) a multiplier of a quantity of free plays of a game;
(x) one or more lottery based awards, such as lottery or drawing tickets;
(xi) a wager match for one or more plays of one or more games;
(xii) an increase in the average expected payback percentage of one or more plays of one or more games;
(xiii) one or more comps, such as a free dinner, a free night's stay at a hotel, a high value product such as a free car, or a low value product such as a free teddy bear;
(xiv) one or more bonus credits usable for online play;
(xv) a lump sum of player tracking points or credits;
(xvi) a multiplier for player tracking points or credits;
(xvii) an increase in a membership or player tracking level;
(xviii) one or more coupons or promotions usable within and/or outside of the gaming establishment (e.g., a 20% off coupon for use at a convenience store);
(xix) one or more virtual goods associated with the gaming system;
(xx) one or more virtual goods not associated with the gaming system;
(xxi) an access code usable to unlock content on the internet;
(xxii) an ordinal value;
(xxiii) a modification of the pool of available awards (i.e., an advance to a more lucrative pool of available awards which the gaming system randomly selects awards from);
(xxiv) a modification of an amount of promotional credits;
(xxv) a modification of a placed wager amount;
(xxvi) a modification of a wager amount available to be placed;
(xxvii) a modification of a placed side wager amount;
(xxviii) a modification of a side wager amount available to be placed;
(xxix) a modification of a number of wagered on paylines;
(xxx) a modification of a number of paylines available to be wagered on;
(xxxi) a modification of a wager placed on one or more paylines (or on one or more designated paylines);
(xxxii) a modification of a number of ways to win wagered on;
(xxxiii) a modification of a number of available ways to win to be wagered on;
(xxxiv) a modification of a wager placed on one or more ways to win (or on one or more designated ways to win);
(xxxv) a modification of a paytable utilized for a play of a game;
(xxxvi) a modification of an average expected payback percentage of a play of a game;
(xxxvii) a modification of one or more awards available;
(xxxviii) a modification of a range of awards available;
(xxxix) a modification of a type of awards available;
(xi) a modification of one or more progressive awards;
(xli) a modification of one or more modifiers, such as multipliers, available;
(xlii) a modification of an activation of a reel (or a designated reel);
(xliii) a modification of an activation of a plurality of reels;
(xliv) a modification of a generated outcome (or a designated generated outcome);
(xlv) a modification of a generated outcome (or a designated generated outcome) associated with an award over a designated value;
(xlvi) a modification of a generated outcome (or a designated generated outcome) on a designated payline;
(xlvii) a modification of a generated outcome (or a designated generated outcome) in a scatter configuration;
(xlviii) a modification of a winning way to win (or a designated winning way to win);
(xlix) a modification of a designated symbol or symbol combination;
(l) a modification of a generation of a designated symbol or symbol combination on a designated payline;
(li) a modification of a generation of a designated symbol or symbol combination in a scatter configuration;
(lii) a modification of a triggering event of a play of a secondary or bonus game;
(liii) a modification of an activation of a secondary or bonus display (such as an award generator);
(liv) a modification of an activation of a community award generator;
(lv) a modification of a generated outcome (or a designated generated outcome) in a secondary game;
(lvi) a modification of an amount of free spins provided;
(lvii) a modification of a game terminating or ending condition;
(lviii) a modification of how one or more aspects of one or more games (e.g., colors, speeds, sound) are displayed to a player;
(lix) a modification of an amount of credits of a credit balance;
(lx) a modification of any game play feature associated with any play of any game disclosed herein;
(lxi) a book-end wild symbols feature;
(lxii) a stacked wild symbols feature;
(lxiii) an expanding wild symbols feature;
(lxiv) a wild reel feature;
(lxv) a retrigger symbol feature;
(lxvi) an anti-terminator symbol feature;
(lxvii) locking reel feature;
(lxviii) a locking symbol position feature;
(lxix) any feature described herein;
(lxx) a play of any suitable slot game;

(lxxi) a play of any suitable free spins or free game activations;
(lxxii) a play of any suitable wheel game;
(lxxiii) a quantity of spins of a wheel of a wheel game;
(lxxiv) a quantity of indicators of a wheel of a wheel game;
(lxxv) a play of any suitable card game;
(lxxvi) a play of any suitable offer and acceptance game;
(lxxvii) a play of any suitable award ladder game;
(lxxviii) a play of any suitable puzzle-type game;
(lxxix) a play of any suitable persistence game;
(lxxx) a play of any suitable selection game;
(lxxxi) a quantity of picks of a selection game;
(lxxxii) a play of any suitable cascading symbols game;
(lxxxiii) a play of any suitable ways to win game;
(lxxxiv) a play of any suitable scatter pay game;
(lxxxv) a play of any suitable coin-pusher game;
(lxxxvi) a play of any suitable elimination game;
(lxxxvii) a play of any suitable stacked wilds game;
(lxxxv) a play of any suitable trail game;
(lxxxix) a play of any suitable bingo game;
(xc) a play of any suitable video scratch-off game;
(xci) a play of any suitable pick-until-complete game;
(xcii) a play of any suitable shooting simulation game;
(xci) a play of any suitable racing game;
(xciv) a play of any suitable promotional game;
(xcv) a play of any suitable high-low game;
(xcvi) a play of any suitable lottery game;
(xcvii) a play of any suitable number selection game;
(xcviii) a play of any suitable dice game;
(xcix) a play of any suitable skill game;
(c) a play of any suitable auction game;
(ci) a play of any suitable reverse-auction game;
(cii) a play of any suitable group game; and/or
(ciii) a play of any other suitable type of game.

In one embodiment, the gaming system causes at least one display device of the player's gaming device to display the offer and acceptance game. In another embodiment, in addition or in alternative to each gaming device displaying the offer and acceptance game, the gaming system causes one or more community or overhead display devices to display part or all of the offer and acceptance game to one or more other players or bystanders either at a gaming establishment or viewing over a network, such as the internet. In another embodiment, in addition or in alternative to each gaming device displaying the offer and acceptance game, the gaming system causes one or more internet sites to each display the offer and acceptance game such that a player is enabled to log on from a personal web browser. In another such embodiment, the gaming system enables the player to play one or more primary games on one device while viewing the offer and acceptance game from another device. For example, the gaming system enables the player to play one or more primary games on a mobile phone while viewing the status of the offer and acceptance game on a desktop or laptop computer.

In another embodiment, as mentioned above, an offer and acceptance game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes an offer and acceptance game triggering event to occur.

In another embodiment, as also mentioned above, the gaming system does not provide any apparent reasons to the players for an offer and acceptance game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, an offer and acceptance game triggering event occurs, based on an amount of coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, an offer and acceptance game triggering event occurs, based on an amount of coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, an offer and acceptance game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, an offer and acceptance game triggering event occurs, based on a quantity of games played. In this embodiment, a quantity of games played is set for when one or more of such events or conditions will occur. In one embodiment, such a set quantity of games played is based on historic data.

In another alternative embodiment, an offer and acceptance game triggering event occurs, based on time. In this embodiment, a time is set for when one or more of such events or conditions will occur. In one embodiment, such a set time is based on historic data.

In another alternative embodiment, an offer and acceptance game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, an offer and acceptance game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, an offer and acceptance game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing an offer and acceptance game triggering event to occur may be implemented in accordance with the gaming system and method disclosed herein.

It should be appreciated that any of the above-described offer and acceptance game triggering events may be combined in one or more different embodiments.

Alternative Embodiments

It should be appreciated that in different embodiments, one or more of:

i. when an offer and acceptance game triggering event occurs;

ii. a quantity of rounds of the triggered offer and acceptance game;

iii. a quantity of awards in the pool of available awards;

iv. a quantity of awards in the pool of available awards displayed to the player;

v. which awards in the pool of available awards are displayed to the player;

vi. which types of awards are included in the pool of available awards;

vii. which awards are included in the pool of available awards;

viii. a minimum quantity of awards in one or more formed subsets of randomly selected awards;

ix. a maximum quantity of awards in one or more formed subset of randomly selected awards;

x. a probability of being accumulated associated with one or more of the awards of the formed subset of randomly selected awards;

xi. a quantity of awards randomly selected for the triggered offer and acceptance game;

xii. a quantity of awards randomly selected per round of the offer and acceptance game;

xiii. a quantity of randomly selected awards accumulated for the triggered offer and acceptance game;

xiv. a quantity of randomly selected awards accumulated per round of the offer and acceptance game;

xv. whether to modify the pool of available awards;

xvi. whether to modify one or more formed subsets of randomly selected awards;

xvii. whether to add one or more previously removed awards back to the pool of available awards;

xviii. which previously removed awards to add back to the pool of available awards; and/or xix. any determination disclosed herein; is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (RDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
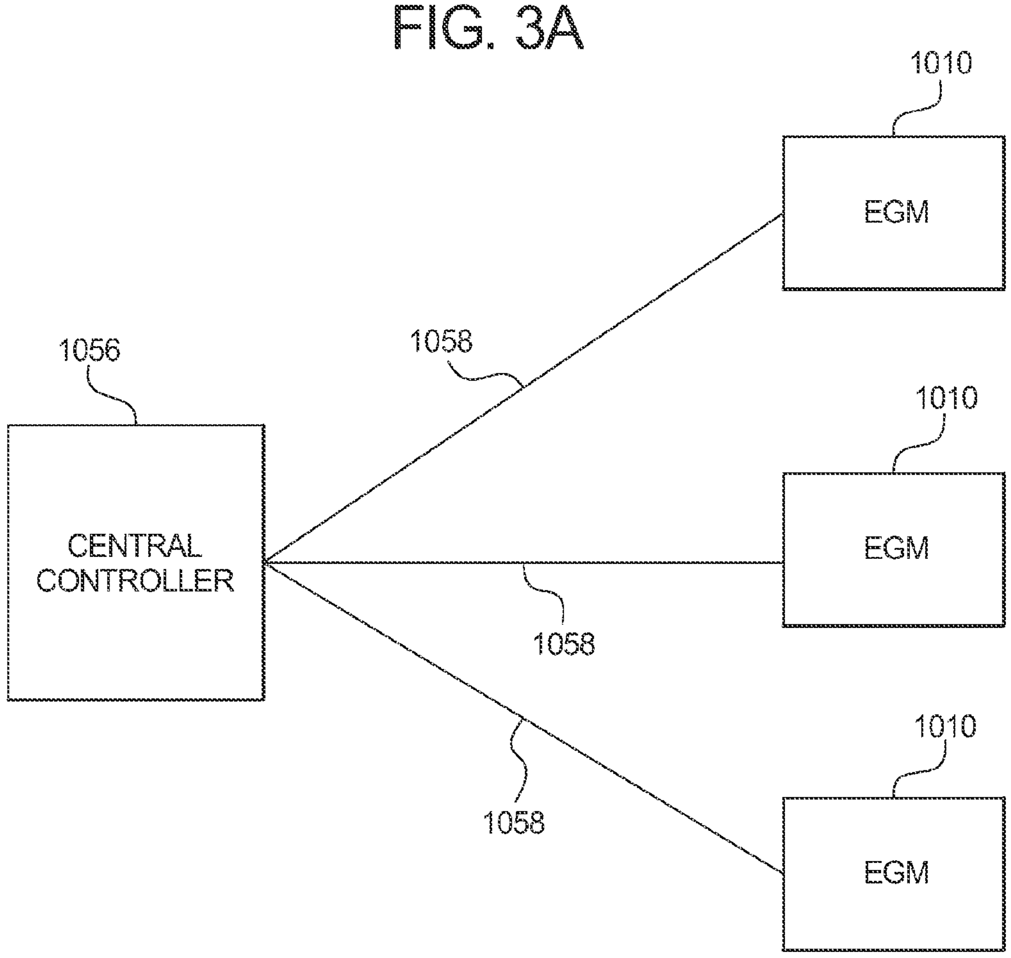
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an Internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 33 illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read Only memory (ROM). In certain embodiments, the at least one memory device of the EGM includes flash memory and/or EEPROM (electrically erasable programmable read only memory). The example EGM illustrated in FIG. 33 includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 3B:
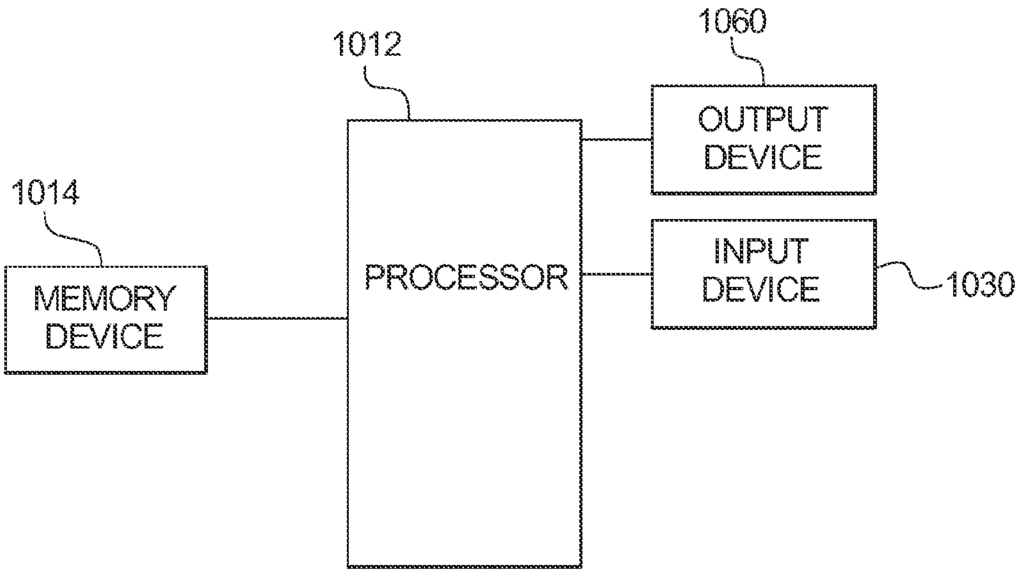
FIG. 3B is a schematic block diagram of one embodiment of an electronic configuration of the gaming system disclosed herein.
Figure 4A:
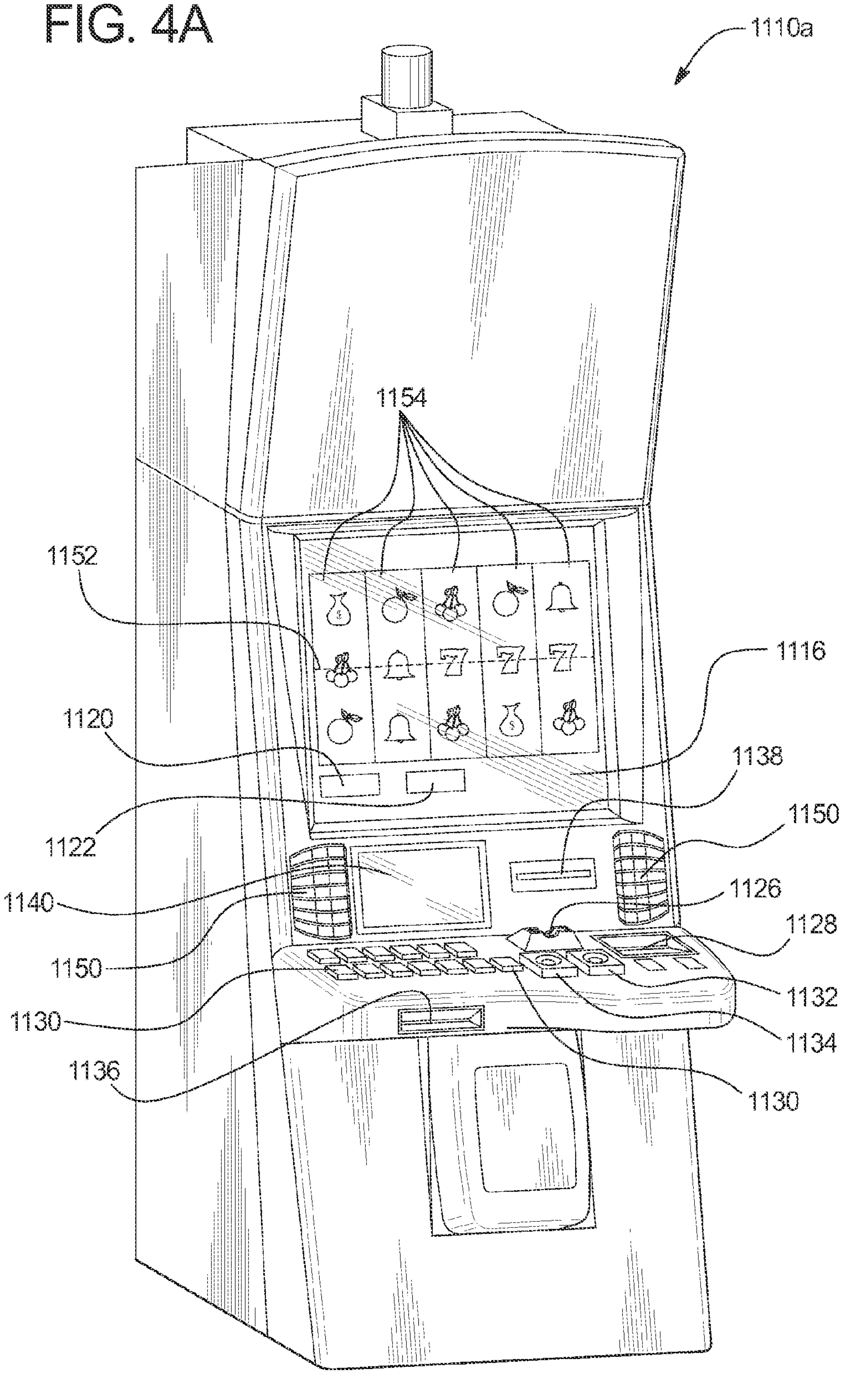
FIGS. 4A and 4B are perspective views of example alternative embodiments of the gaming system disclosed herein.
Figure 4B:
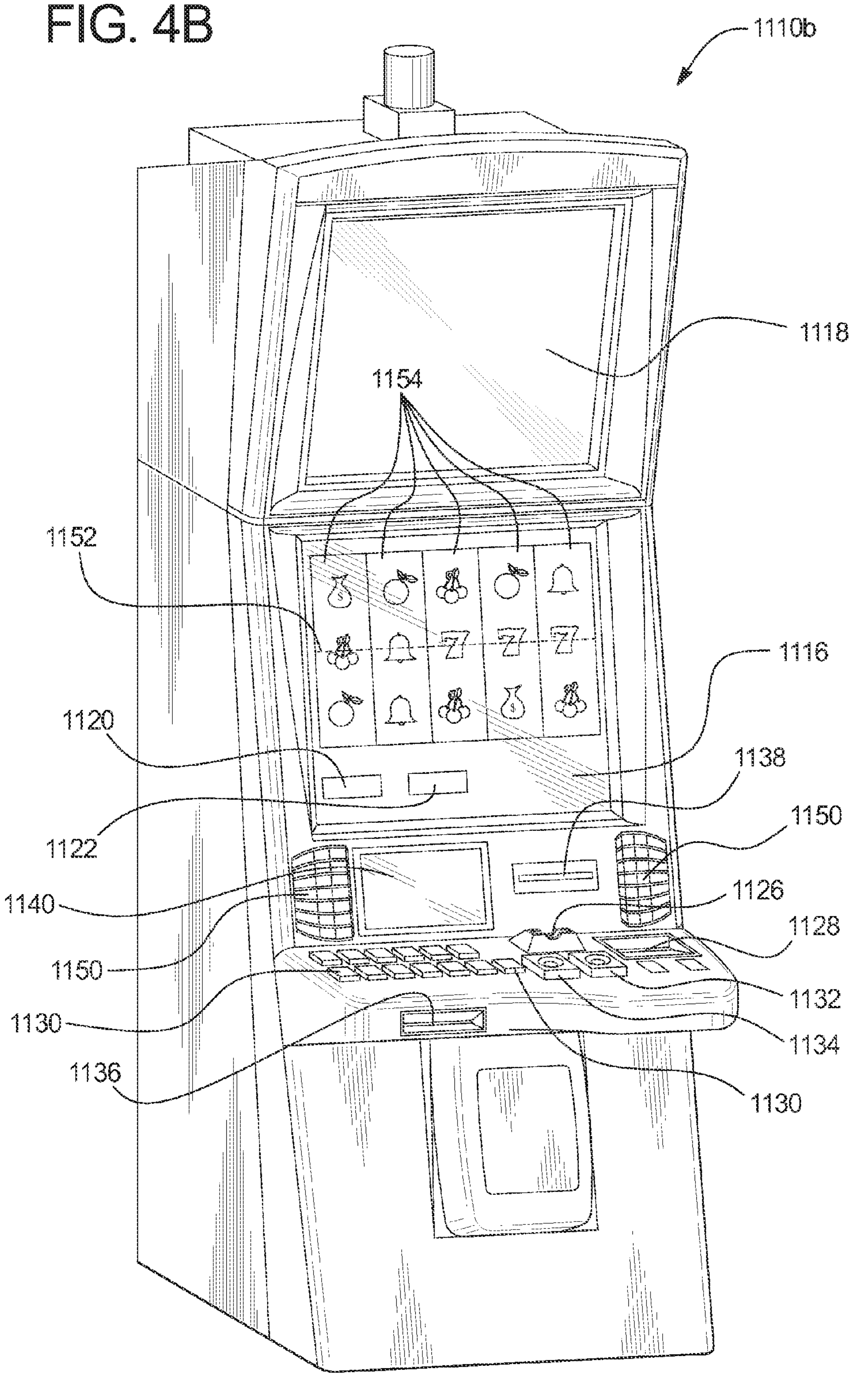

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified players gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with the at least one display device and the at least one input device to, for a play of a game:

(a) display a plurality of available awards to a player, (b) randomly select one of the plurality of available awards, (c) form an award subset including the randomly selected award, (d) remove the randomly selected award from the plurality of available awards, wherein said removed award is unavailable to be randomly selected again for the play of the game, and (e) if the randomly selected award is not a final award:

(i) enable the player to accept or reject the formed award subset, (ii) if the player accepts the formed award subset:

(A) randomly select one of the awards from the formed award subset, and (B) accumulate the randomly selected award from the formed subset of award, and (iii) if the player rejects the formed award subset:

(A) randomly select another one of the plurality of available awards, (B) add the other randomly selected award to the formed award subset, and (C) repeat (d) to (e) at least once.

2. The gaming system of claim 1, wherein the play of the game includes a plurality of rounds and when executed by the at least one processor, the plurality of instructions cause the at least one processor to repeat (b) to (e) for each of the rounds.

3. The gaming system of claim 2, wherein when executed by the at least one processor, the plurality of instructions cause the at least one processor to determine a total award based on the accumulated awards for each of the rounds.

4. The gaming system of claim 1, wherein when executed by the at least one processor if the randomly selected award is the final award, the plurality of instructions cause the at least one processor to randomly select one of the awards from the formed award subset, and accumulate the randomly selected award from the formed subset of award.

5. The gaming system of claim 1, wherein a plurality of the awards of the formed award subset each have a different probability of being randomly selected from the formed award subset.

6. The gaming system of claim 1, wherein when executed by the at least one processor, the plurality of instructions cause the at least one processor to enable the player to reject the formed award subset a designated quantity of times.

7. The gaming system of claim 1, wherein when executed by the at least one processor, the plurality of instructions cause the at least one processor to provide to the player each award randomly selected from the plurality of available awards.

8. The gaming system of claim 1, wherein at least one of the plurality of available awards is selected from the group consisting of: a quantity of monetary credits, a quantity of non-monetary credits, a quantity of promotional credits, a quantity of player tracking points, a progressive award, a modifier, a quantity of free plays of at least one wagering game, a quantity of plays of at least one non-wagering game, a multiplier of a quantity of free plays of a game, at least one lottery based award, a quantity of credits usable for an online play of an online game, a quantity of virtual goods and an access code usable to unlock content on an internet.

9. A method of operating a gaming system, for a play of a game, said method comprising:

(a) causing at least one display device to display a plurality of available awards to a player, (b) causing at least one processor to execute a plurality of instructions to randomly select one of the plurality of available awards, (c) causing the at least one processor to execute the plurality of instructions to form an award subset including the randomly selected award, (d) causing the at least one processor to execute the plurality of instructions to remove the randomly selected award from the plurality of available awards, wherein said removed award is unavailable to be randomly selected again for the play of the game, and (e) if the randomly selected award is not a final award:

(i) enabling the player to accept or reject the formed award subset, (ii) if the player accepts the formed award subset:

(A) causing the at least one processor to execute the plurality of instructions to randomly select one of the awards from the formed award subset, and (B) causing the at least one processor to execute the plurality of instructions to accumulate the randomly selected award from the formed subset of award, and (iii) if the player rejects the formed award subset:

(A) causing the at least one processor to execute the plurality of instructions to randomly select another one of the plurality of available awards, (B) causing the at least one processor to execute the plurality of instructions to add the other randomly selected award to the formed award subset, and (C) repeating (d) to (e) at least once.

10. The method of claim 9, which includes repeating (b) to (e) for each of a plurality of rounds of the play of the game.

11. The method of claim 10, which includes causing the at least one processor to execute the plurality of instructions to determine a total award based on the accumulated awards for each of the rounds.

12. The method of claim 9, which includes, if the randomly selected award is the final award, causing the at least one processor to execute the plurality of instructions to randomly select one of the awards from the formed award subset, and accumulate the randomly selected award from the formed subset of award.

13. The method of claim 9, wherein a plurality of the awards of the formed award subset each have a different probability of being randomly selected from the formed award subset.

14. The method of claim 9, which includes enabling the player to reject the formed award subset a designated quantity of times.

15. The method of claim 9, which includes providing to the player each award randomly selected from the plurality of available awards.

16. The method of claim 9, wherein at least one of the plurality of available awards is selected from the group consisting of: a quantity of monetary credits, a quantity of non-monetary credits, a quantity of promotional credits, a quantity of player tracking points, a progressive award, a modifier, a quantity of free plays of at least one wagering game, a quantity of plays of at least one non-wagering game, a multiplier of a quantity of free plays of a game, at least one lottery based award, a quantity of credits usable for an online play of an online game, a quantity of virtual goods and an access code usable to unlock content on an internet.

17. The method of claim 9, which is provided through a data network.

18. The method of claim 17, wherein the data network is the internet.

* * * * *